(12) United States Patent
Jagger et al.

(10) Patent No.: US 9,031,509 B2
(45) Date of Patent: *May 12, 2015

(54) METHOD AND DEVICE FOR MAINTAINING THE PERFORMANCE QUALITY OF A COMMUNICATION SYSTEM IN THE PRESENCE OF NARROW BAND INTERFERENCE

(71) Applicant: ISCO International, LLC, Schaumburg, IL (US)

(72) Inventors: Charles E. Jagger, North York (CA); Mark N. Willetts, Ottawa (CA); Micolino Tobia, Woodbridge (CA)

(73) Assignee: ISCO International, LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/314,674

(22) Filed: Jun. 25, 2014

(65) Prior Publication Data

US 2014/0308900 A1    Oct. 16, 2014

Related U.S. Application Data

(60) Continuation of application No. 14/044,262, filed on Oct. 2, 2013, now Pat. No. 8,792,833, which is a continuation of application No. 13/551,440, filed on Jul. 17, 2012, now Pat. No. 8,576,808, which is a (Continued)

(51) Int. Cl.
*H04W 24/04*    (2009.01)
*H04W 24/00*    (2009.01)

(Continued)

(52) U.S. Cl.
CPC ............. *H04W 24/00* (2013.01); *H04B 1/1036* (2013.01); *H04B 7/005* (2013.01); *H04W 24/02* (2013.01);

(Continued)

(58) Field of Classification Search
USPC .................. 455/423, 424, 63.1, 67.11, 67.13, 455/226.1, 296; 375/346, 349
See application file for complete search history.

(56) References Cited

U.S. PATENT DOCUMENTS 3,732,500 A    5/1973   Dishal
3,781,705 A    12/1973  Dishal (Continued)

FOREIGN PATENT DOCUMENTS

CA    2260653    1/2000
CA    2288633    4/2000

(Continued)

OTHER PUBLICATIONS

"International Search Report & Written Opinion", PCT/US01/11351, Apr. 2002.

(Continued)

*Primary Examiner* — Thanh Le
(74) *Attorney, Agent, or Firm* — Guntin & Gust, PLC; Douglas Schnabel

(57) ABSTRACT

A system that incorporates teachings of the subject disclosure may include, for example, a method for analyzing a wide frequency band with respect to signal power levels in specified narrow frequency bands, detecting narrow band signal power levels received in the specified narrow frequency bands, determining an average composite wideband power level from the narrow band signal power levels, and determining an adaptive threshold from the narrow band signal power levels for detecting narrow band interferers in the wide frequency band. Other embodiments are disclosed.

20 Claims, 17 Drawing Sheets

Related U.S. Application Data continuation of application No. 11/971,017, filed on Jan. 8, 2008, now abandoned, which is a division of application No. 09/827,641, filed on Apr. 6, 2001, now Pat. No. 7,317,698, which is a continuation-in-part of application No. 09/301,477, filed on Apr. 28, 1999, now Pat. No. 6,807,405.

(60) Provisional application No. 60/195,387, filed on Apr. 7, 2000.

(51) Int. Cl.
    H04B 1/10    (2006.01)
    H04B 7/005    (2006.01)
    H04W 24/02    (2009.01)
    H04B 15/00    (2006.01)
    H04W 72/04    (2009.01)
    H04W 28/04    (2009.01)
    H04B 1/71    (2011.01)

(52) U.S. Cl.
CPC ................ *H04W 24/04* (2013.01); *H04B 1/71* (2013.01); *H04B 15/00* (2013.01); *H04B 2001/1063* (2013.01); *H04W 72/0453* (2013.01); *H04W 28/048* (2013.01)

(56) References Cited

U.S. PATENT DOCUMENTS

| | | |
|---|---|---|
| 3,783,397 A | 1/1974 | Dishal |
| 3,887,222 A | 6/1975 | Hammond |
| 3,911,366 A | 10/1975 | Baghdady |
| 4,027,264 A | 5/1977 | Gutleber |
| 4,328,591 A | 5/1982 | Baghdady |
| 4,513,249 A | 4/1985 | Baghdady |
| 4,712,235 A | 12/1987 | Jones |
| 4,859,958 A | 8/1989 | Myers |
| 4,992,747 A | 2/1991 | Myers |
| 5,038,115 A | 8/1991 | Myers |
| 5,038,145 A | 8/1991 | DeCesare et al. |
| 5,048,015 A | 9/1991 | Zilberfarb |
| 5,168,508 A | 12/1992 | Iwasaki |
| 5,185,762 A | 2/1993 | Schilling |
| 5,226,057 A | 7/1993 | Boren |
| 5,263,048 A | 11/1993 | Wade |
| 5,282,023 A | 1/1994 | Scarpa |
| 5,303,413 A | 4/1994 | Braegas |
| 5,307,517 A | 4/1994 | Rich |
| 5,325,204 A | 6/1994 | Scarpa |
| 5,343,496 A | 8/1994 | Honig |
| 5,381,150 A | 1/1995 | Hawkins et al. |
| 5,497,505 A | 3/1996 | Koohgoli et al. |
| 5,500,872 A | 3/1996 | Kinney |
| 5,541,959 A | 7/1996 | Myers |
| 5,570,350 A | 10/1996 | Myer |
| 5,596,600 A | 1/1997 | Dimos |
| 5,640,146 A | 6/1997 | Campana |
| 5,640,385 A | 6/1997 | Long |
| RE35,650 E | 11/1997 | Partyka |
| 5,703,874 A | 12/1997 | Schilling |
| 5,721,733 A | 2/1998 | Wang et al. |
| 5,758,275 A | 5/1998 | Cox |
| 5,822,373 A | 10/1998 | Addy |
| 5,838,742 A | 11/1998 | Abu-Dayya |
| 5,852,630 A | 12/1998 | Langberg |
| 5,857,143 A | 1/1999 | Kataoka |
| 5,926,761 A | 7/1999 | Reed et al. |
| 5,947,505 A | 9/1999 | Martin |
| 5,949,368 A | 9/1999 | DeCesare |
| 5,960,329 A | 9/1999 | Ganesh et al. |
| 5,966,657 A | 10/1999 | Sporre |
| 5,970,105 A | 10/1999 | Dacus |
| 5,974,101 A | 10/1999 | Nago |
| 5,978,362 A | 11/1999 | Lee |
| 6,005,899 A | 12/1999 | Khayrallah |
| 6,009,129 A | 12/1999 | Kenney et al. |
| 6,020,783 A | 2/2000 | Coppola |
| 6,035,213 A | 3/2000 | Tokuda |
| 6,038,250 A | 3/2000 | Shou et al. |
| 6,047,175 A | 4/2000 | Trompower |
| 6,052,158 A | 4/2000 | Nielsen |
| 6,104,934 A | 8/2000 | Patton |
| 6,115,409 A | 9/2000 | Upadhyay |
| 6,115,580 A | 9/2000 | Chuprun et al. |
| 6,118,805 A | 9/2000 | Bergstrom et al. |
| 6,122,309 A | 9/2000 | Bergstrom et al. |
| 6,125,139 A | 9/2000 | Hendrickson et al. |
| 6,127,962 A | 10/2000 | Martinson |
| 6,130,907 A | 10/2000 | Chen |
| 6,167,240 A | 12/2000 | Carlsson et al. |
| 6,167,244 A | 12/2000 | Tomoe |
| 6,205,334 B1 | 3/2001 | Dent |
| 6,208,629 B1 | 3/2001 | Jaszewski et al. |
| 6,215,812 B1 | 4/2001 | Young |
| 6,289,004 B1 | 9/2001 | Mesecher et al. |
| 6,313,620 B1 | 11/2001 | Richardson |
| 6,327,245 B1 | 12/2001 | Satyanarayana et al. |
| 6,327,312 B1 | 12/2001 | Jovanovich |
| 6,360,077 B2 | 3/2002 | Mizoguchi |
| 6,377,606 B1 | 4/2002 | Toskala et al. |
| 6,393,284 B1 | 5/2002 | Dent |
| 6,426,983 B1 | 7/2002 | Rakib et al. |
| 6,430,164 B1 | 8/2002 | Jones |
| 6,577,670 B1 | 6/2003 | Roberts |
| 6,704,378 B2 | 3/2004 | Jagger |
| 6,718,166 B2 | 4/2004 | Cordone |
| 6,791,995 B1 | 9/2004 | Azenkot et al. |
| 6,807,405 B1 | 10/2004 | Jagger |
| 6,843,819 B2 | 1/2005 | Suzuki et al. |
| 6,959,170 B2 | 10/2005 | Vannatta |
| 7,054,396 B2 | 5/2006 | Shan |
| 7,317,698 B2 | 1/2008 | Jagger |
| 7,457,382 B1 | 11/2008 | Jones |
| 7,525,942 B2 | 4/2009 | Cordone |
| 8,718,024 B2 | 5/2014 | Jagger et al. |
| 8,811,552 B2 * | 8/2014 | Bayesteh et al. ............... 375/346 |
| 2002/0057751 A1 | 5/2002 | Jagger |
| 2002/0155812 A1 | 10/2002 | Takada |
| 2003/0123530 A1 | 7/2003 | Maeda |
| 2003/0142759 A1 | 7/2003 | Anderson et al. |
| 2003/0216122 A1 | 11/2003 | Cordone |
| 2004/0048574 A1 | 3/2004 | Walker et al. |
| 2005/0078734 A1 | 4/2005 | Baker |
| 2007/0047494 A1 | 3/2007 | Cordone |
| 2007/0105520 A1 | 5/2007 | Van Houtum |
| 2007/0183483 A1 | 8/2007 | Narayan |
| 2007/0274279 A1 | 11/2007 | Wood |
| 2008/0043612 A1 | 2/2008 | Geile |
| 2009/0161614 A1 | 6/2009 | Grandblaise |
| 2009/0233568 A1 | 9/2009 | Zhang |
| 2010/0227613 A1* | 9/2010 | Kim et al. ..................... 455/434 |
| 2011/0014938 A1 | 1/2011 | Shekalim |
| 2011/0200126 A1 | 8/2011 | Bontu et al. |

FOREIGN PATENT DOCUMENTS

| | | |
|---|---|---|
| CN | 1173101 | 2/1998 |
| EP | 0704986 | 4/1996 |
| EP | 0812069 | 12/1997 |
| GB | 2304000 A | 3/1997 |
| JP | 06-061876 | 3/1994 |
| JP | 09-326713 | 12/1997 |
| WO | 98/10514 | 3/1998 |
| WO | 00/46929 | 8/2000 |
| WO | 2007/063514 | 6/2007 |

OTHER PUBLICATIONS

Berlemann, et al., "Cognitive Radio and IVIanagement of Spectrtun and Radio Resources in Reconfigurable Networks", Wireless World Research Forum, Working Group 6 White Paper, 2005.

(56) References Cited

OTHER PUBLICATIONS

Milstein, "Interference Rejection Techniques in Spread Spectrum Communications", Proceedings of the IEEE, vol. 76, No. 6, Jun. 1988.

Patent Cooperation Treaty, "International Search Report and Written Opinion date Jun. 1, 2010, International Application No. PCT/US2009/064191".

Patent Cooperation Treaty, "International Search Report and Written Opinion dated Jun. 1, 2010, from International Application No. PCT/US2009/064191".

Poor, et al., "Narrowband Interference Suppression in Spread Spectrum COMA", IEEE Personal Communications Magazine, Third Quarter, 1994, pp. 14-27.

Salgado-Galicia, Hector et al., "A Narrowband Approach to Efficient PCS Spectrum Sharing Through Decentralized DCA Access Policies", IEEE Personal Communications, Feb. 1997, 24-34.

\* cited by examiner

METHOD AND DEVICE FOR MAINTAINING THE PERFORMANCE QUALITY OF A COMMUNICATION SYSTEM IN THE PRESENCE OF NARROW BAND INTERFERENCE

CROSS-REFERENCE TO RELATED APPLICATIONS

This application is a continuation of U.S. patent application Ser. No. 14/044,262, filed Oct. 2, 2013, which is a continuation of U.S. patent application Ser. No. 13/551,440, filed Jul. 17, 2012, which is a continuation of U.S. patent application Ser. No. 11/971,017, filed Jan. 8, 2008, which is a divisional of U.S. application Ser. No. 09/827,641, filed on Apr. 6, 2001, now U.S. Pat. No. 7,317,698, which is a continuation-in-part of U.S. patent application Ser. No. 09/301,477, filed on Apr. 28, 1999, now U.S. Pat. No. 6,807,405, which claims priority to Canadian Patent 2,260,653, filed Feb. 2, 1999. U.S. application Ser. No. 09/827,641, filed Apr. 6, 2001, now U.S. Pat. No. 7,317,698, also claims priority to U.S. Provisional Application 60/195,387, filed Apr. 7, 2000. All sections of U.S. patent application Ser. No. 14/044,262, U.S. patent application Ser. No. 13/551,440 and U.S. patent application Ser. No. 11/971,017 are incorporated herein by reference in their entirety.

FIELD OF THE DISCLOSURE

The present disclosure directed to communication systems and, more particularly, to a technique for detecting, identifying, extracting and eliminating narrowband interference in a wideband communication system.

BACKGROUND OF THE DISCLOSURE

As shown in FIG. 1, an exemplary telecommunication system 10 may include mobile units 12, 13, a number of base stations, two of which are shown in FIG. 1 at reference numerals 14 and 16, and a switching station 18 to which each of the base stations 14, 16 may be interfaced. The base stations 14, 16 and the switching station 18 may be collectively referred to as network infrastructure.

During operation, the mobile units 12, 13 exchange voice data or other information with one of the base stations 14, 16, each of which are connected to a conventional land line telephone network. For example, information, such as voice information, transferred from the mobile unit 12 to one of the base stations 14, 16 is coupled from the base station to the telephone network to thereby connect the mobile unit 12 with a land line telephone so that the land line telephone may receive the voice information. Conversely, information, such as voice information may be transferred from a land line telephone to one of the base stations 14, 16, which, in turn, transfers the information to the mobile unit 12.

The mobile units 12, 13 and the base stations 14, 16 may exchange information in either analog or digital format. For the purposes of this description, it is assumed that the mobile unit 12 is a narrowband analog unit and that the mobile unit 13 is a wideband digital unit. Additionally, it is assumed that the base station 14 is a narrowband analog base station that communicates with the mobile unit 12 and that the base station 16 is a wideband digital base station that communicates with the mobile unit 13.

Analog format communication takes place using narrowband 30 kilohertz (KHz) channels. The advanced mobile phone systems (AMPS) is one example of an analog communication system in which the mobile unit 12 communicates with the base station 14 using narrowband channels. Alternatively, the mobile unit 13 communicates with the base stations 16 using a form of digital communications such as, for example, code-division multiple access (CDMA) or time-division multiple access (TDMA). Digital communication takes place using spread spectrum techniques that broadcast signals having wide bandwidths, such as, for example, 1.25 megahertz (MHz) bandwidths.

The switching station 18 is generally responsible for coordinating the activities of the base stations 14, 16 to ensure that the mobile units 12, 13 are constantly in communication with the base station 14, 16 or with some other base stations that are geographically dispersed. For example, the switching station 18 may coordinate communication handoffs of the mobile unit 12 between the base stations 14 and another analog base station as the mobile unit 12 roams between geographical areas that are covered by the two base stations.

One particular problem that may arise in the telecommunication system 10 is when the mobile unit 12 or the base station 14, each of which communicate using narrowband channels, interfere with the ability of the base station 16 to receive and process wideband digital signals from the digital mobile unit 13. In such a situation, the narrowband signal transmitted from the mobile unit 12 or the base station 14 may interfere with the ability of the base station 16 to properly receive wideband communication signals.

SUMMARY OF THE INVENTION

According to one aspect, the present disclosure may be embodied in a method of detecting and eliminating narrowband interference in a wideband communication signal having a frequency bandwidth with narrowband channels disposed therein. Such a method may include scanning at least some of the narrowband channels to determine signal strengths in at least some of the narrowband channels and determining a threshold based on the signal strengths in at least some of the narrowband channels. Additionally, the method may include identifying narrowband channels having signal strengths exceeding the threshold and assigning filters to at least some of the narrowband channels having signal strengths exceeding the threshold. Furthermore, the method may include determining if the assigned filters are operating properly and bypassing any of the assigned filters that are not operating properly.

According to a second aspect, the present disclosure may be embodied in a system adapted to detect and eliminate narrowband interference in a wideband communication signal having a frequency bandwidth with narrowband channels disposed therein. Such a system may include a scanner adapted to scan at least some of the narrowband channels to determine signal strengths in at least some of the narrowband channels, a notch module adapted to receive the wideband communication signal and to selectively remove narrowband interference from the wideband communication signal to produce a filtered wideband communication signal and a bypass switch adapted to bypass the notch module when the bypass switch is enabled. Furthermore, the system may include a controller coupled to the scanner and to the notch module, wherein the controller is adapted to determine a threshold based on the signal strengths in at least some of the narrowband channels. Furthermore, the controller may be adapted to identify narrowband channels having signal strengths exceeding the threshold, to control the notch module to filter the wideband communication signal at a frequency corresponding to a narrowband channel having a signal strength exceeding the threshold, to determine if the notch module is operating properly and to enable the bypass switch when the notch module is not operating properly.

According to a third aspect, the present disclosure may be embodied in a method of detecting and eliminating narrowband interference in a wideband communication signal having a frequency bandwidth with narrowband channels disposed therein. Such a method may include scanning at least some of the narrowband channels to determine signal strengths in at least some of the narrowband channels, determining a threshold based on the signal strengths in at least some of the narrowband channels and identifying fading narrowband channels having signal strengths that do not exceed the threshold and that were previously identified as exceeding the threshold, based on how long the identified narrowband channels have not exceeded the threshold. Additionally, the method may include filtering the wideband communication signal at a frequency corresponding to a fading narrowband channel.

According to a second aspect, the present disclosure may be embodied in a system adapted to detect and eliminate narrowband interference in a wideband communication signal having a frequency bandwidth with narrowband channels disposed therein. Such a system may include a scanner adapted to scan at least some of the narrowband channels to determine signal strengths in at least some of the narrowband channels in an order representative of a probability that the narrowband channels will have interference and a notch module adapted to receive the wideband communication signal and to selectively remove narrowband interference from the wideband communication signal to produce a filtered wideband communication signal. The system may also include a controller coupled to the scanner and to the notch module, wherein the controller is adapted to determining a threshold based on the signal strengths in at least some of the narrowband channels. The controller may be further adapted to identify fading narrowband channels having signal strengths that do not exceed the threshold and that were previously identified as exceeding the threshold, based on how long the identified narrowband channels have not exceeded the threshold and to control the notch module to filter the wideband communication signal at a frequency corresponding to a fading narrowband channel.

These and other features of the present disclosure will be apparent to those of ordinary skill in the art in view of the description of the preferred embodiments, which is made with reference to the drawings, a brief description of which is provided below.

DETAILED DESCRIPTION OF THE EMBODIMENTS

As disclosed in detail hereinafter, a system and/or a method for detecting, identifying, extracting and reporting interference may be used in a communication system. In particular, such a system or method may be employed in a wideband communication system to protect against, or to report the presence of, narrowband interference, which has deleterious effects on the performance of the wideband communication system.

Figure 1:
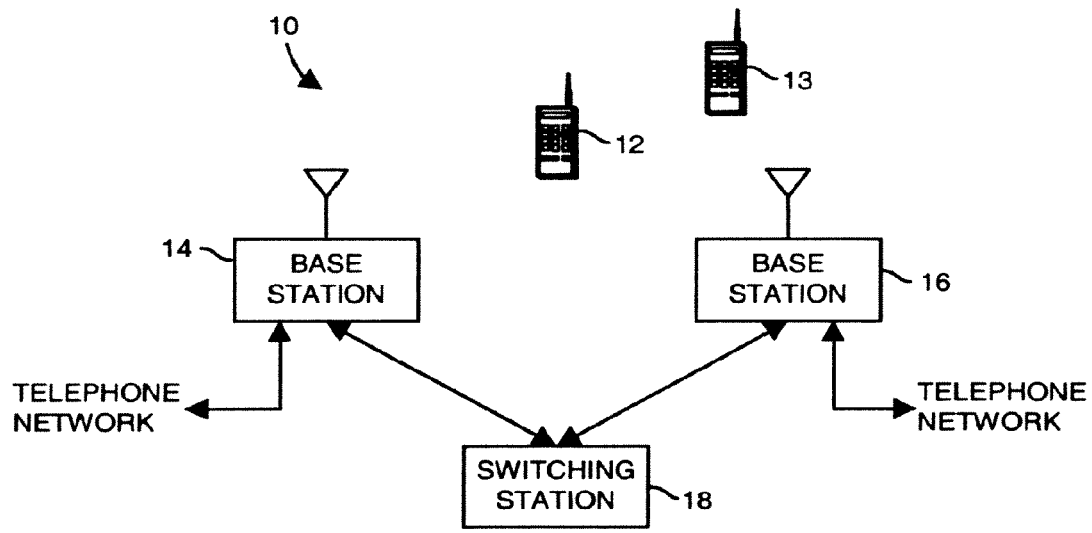
FIG. 1 is an exemplary illustration of a communication system.
Figure 2:
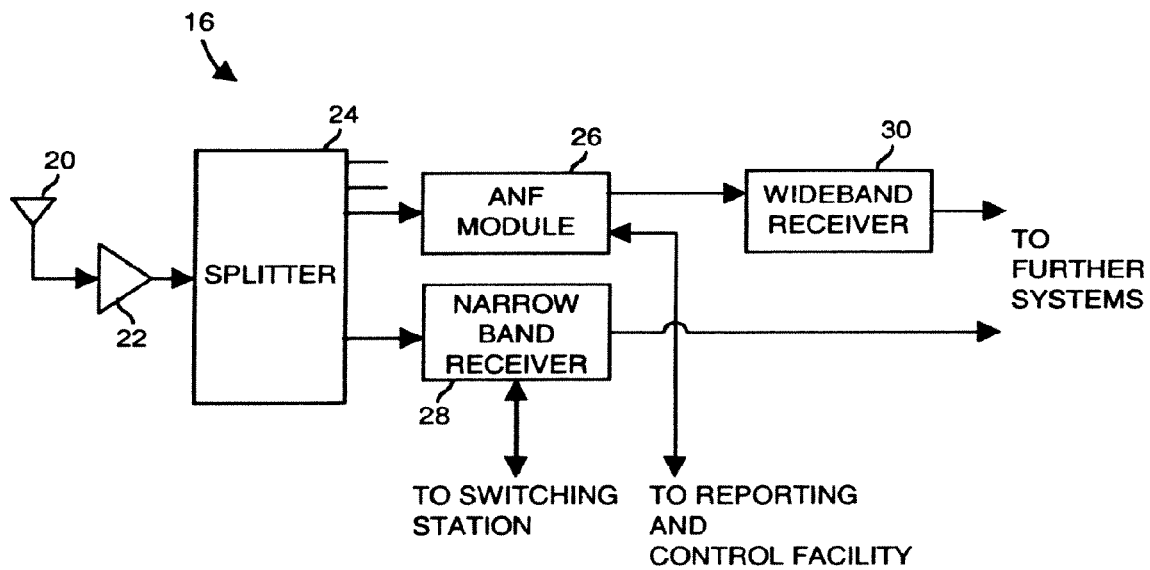
FIG. 2 is an exemplary illustration of a base station of FIG. 1.

As shown in FIG. 2, the signal reception path of the base station 16, which was described as receiving narrowband interference from the mobile unit 12 in conjunction with FIG. 1, includes an antenna 20 that provides signals to a low noise amplifier (LNA) 22. The output of the LNA 22 is coupled to a splitter 24 that splits the signal from the LNA into a number of different paths, one of which may be coupled to an adaptive notch filter (ANF) module 26 and another of which may be coupled to a narrowband receiver 28. The output of the ANF module 26 is coupled to a wideband receiver 30, which may, for example, be embodied in a CDMA receiver or any other suitable wideband receiver. The narrowband receiver 28 may be embodied in a 15 KHz bandwidth receiver or in any other suitable narrowband receiver. Although only one signal path is shown in FIG. 2, it will be readily understood to those having ordinary skill in the art that such a signal path is merely exemplary and that, in reality, a base station may include two or more such signal paths that may be used to process main and diversity signals received by the base station 16.

The outputs of the narrowband receiver 28 and the wideband receiver 30 are coupled to other systems within the base station 16. Such systems may perform voice and/or data processing, call processing or any other desired function. Additionally, the ANF module 26 is also communicatively coupled, via the Internet, telephone lines or any other suitable media, to a reporting and control facility that is remote from the base station 16. In some networks, the reporting and control facility may be integrated with the switching station 18. The narrowband receiver 28 is communicatively coupled to the switching station 18 and may respond to commands that the switching station 18 issues.

Each of the components 20-30 of the base station 16 shown in FIG. 2, except for the ANF module 26, may be found in a conventional wideband cellular base station, the details of which are well known to those having ordinary skill in the art. It will also be appreciated by those having ordinary skill in the art that FIG. 2 does not disclose every system or subsystem of the base station 16 and, rather, focuses on the systems and subsystems of the base station 16 that are relevant to the description of the present disclosure. In particular, it will be readily appreciated that, while not shown in FIG. 2, the base station 16 includes a transmission system or subsystem.

During operation of the base station 16, the antenna 20 receives wideband signals that are broadcast from the mobile unit 13 and couples such signals to the LNA 22, which amplifies the received signals and couples the amplified signals to the splitter 24. The splitter 24 splits the amplified signal from the LNA 22 and essentially puts copies of the amplified signal on each of its output lines. The ANF module 26 receives the signal from the splitter 24 and, if necessary, filters the wideband signal to remove any undesired narrowband interference and couples the filtered wideband signal to the wideband receiver 30.

Figure 3:
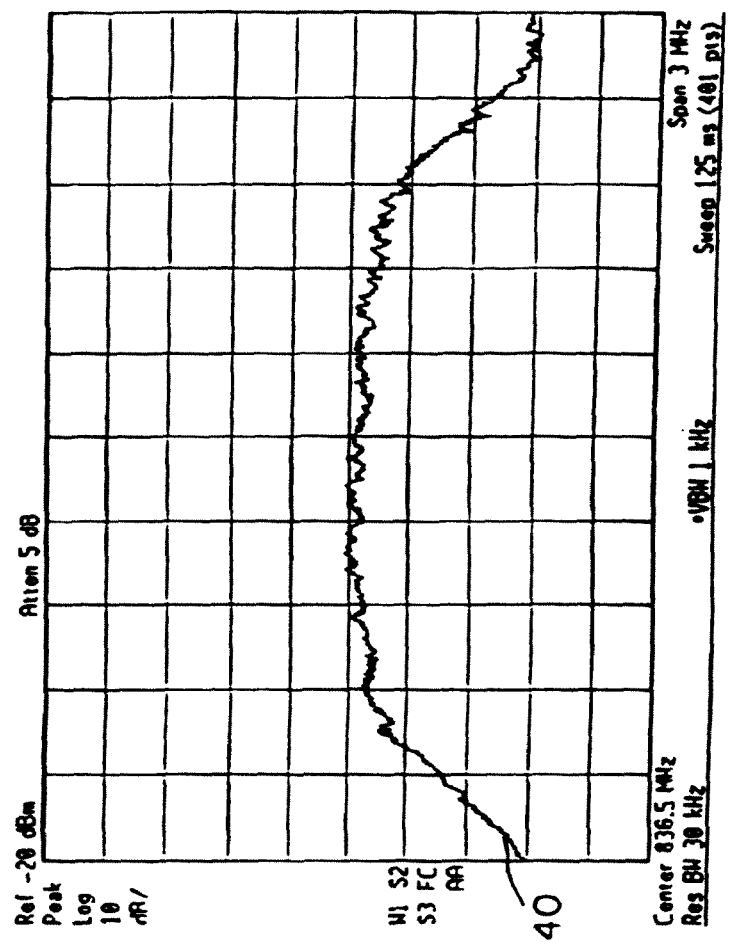
FIG. 3 is an exemplary illustration of a frequency spectrum of a wideband signal in the absence of interference.

FIG. 3 illustrates a frequency spectrum 40 of a wideband signal that may be received at the antenna 20, amplified and split by the LNA 22 and the splitter 24 and coupled to the ANF module 26. If the wideband signal received at the antenna 20 has a frequency spectrum 40 as shown in FIG. 3, the ANF module 26 will not filter the wideband signal and will simply couple the wideband signal directly through the ANF module 26 to the wideband receiver 30.

Figure 4:
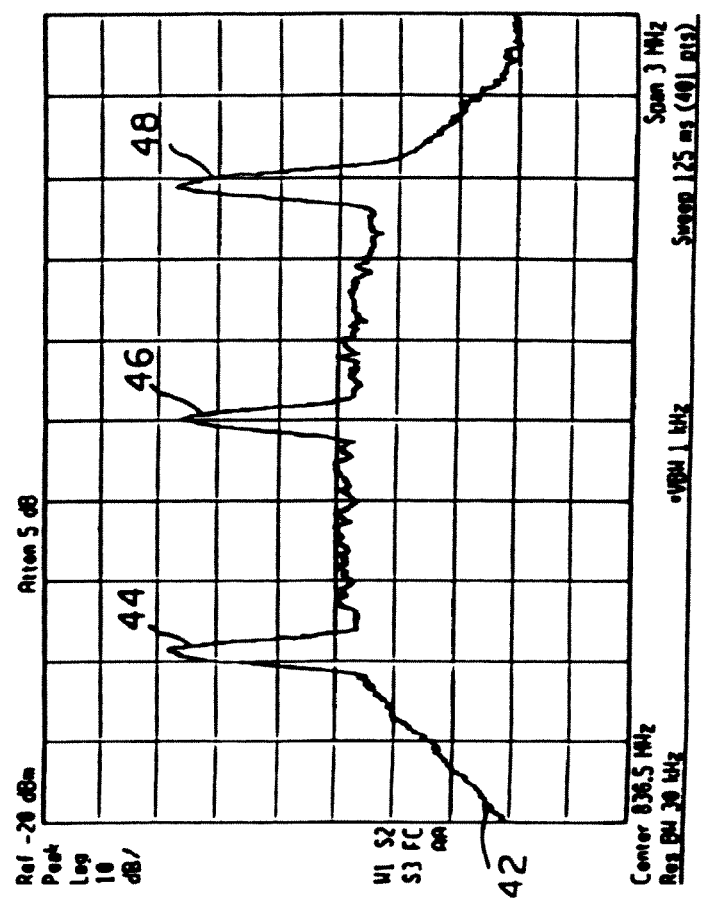
FIG. 4 is an exemplary illustration of a frequency spectrum of a wideband signal in the presence of three narrowband interferers.
Figure 5:
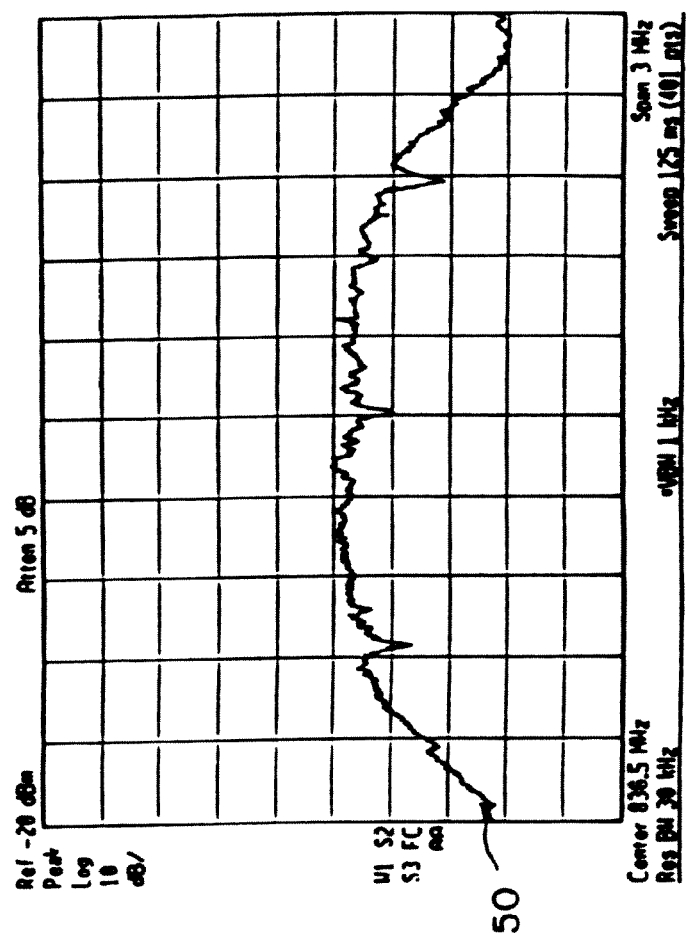
FIG. 5 is an exemplary illustration of a frequency spectrum of a wideband signal having three narrowband interferers removed therefrom.

However, as noted previously, it is possible that the wideband signal transmitted by the mobile unit 13 and received by the antenna 20 has a frequency spectrum 42 as shown in FIG. 4. Such a frequency spectrum 42 includes not only the wideband signal from the mobile unit 13 having a frequency spectrum similar to the frequency spectrum 40 of FIG. 3, but includes three narrowband interferers 44, 46, 48, as shown in FIG. 4, one of which may be from the mobile unit 12. If a wideband signal having a frequency spectrum 42 including narrowband interferers 44, 46, 48 is received by the antenna 20 and amplified, split and presented to the ANF module 26, the ANF module 26 will filter the frequency spectrum 42 to produce a filtered frequency spectrum 50 as shown in FIG. 5.

The filtered frequency spectrum 50 has the narrowband interferers 44, 46, 48 removed, therefore leaving a frequency spectrum 50 that is very similar to the frequency spectrum 40, which does not include any interference. The filtered wideband signal is then coupled from the ANF module 26 to the wideband receiver 30, so that the filtered wideband signal spectrum 50 may be demodulated. Although some of the wideband signal was removed during filtering by the ANF module 26, sufficient wideband signal remains to enable the wideband receiver 30 to recover the information that was broadcast by a mobile unit. Accordingly, in general terms, the ANF module 26 selectively filters wideband signals to remove narrowband interference therefrom. Further detail regarding the ANF module 26 and its operation is provided below in conjunction with FIGS. 6-17.

Figure 6:
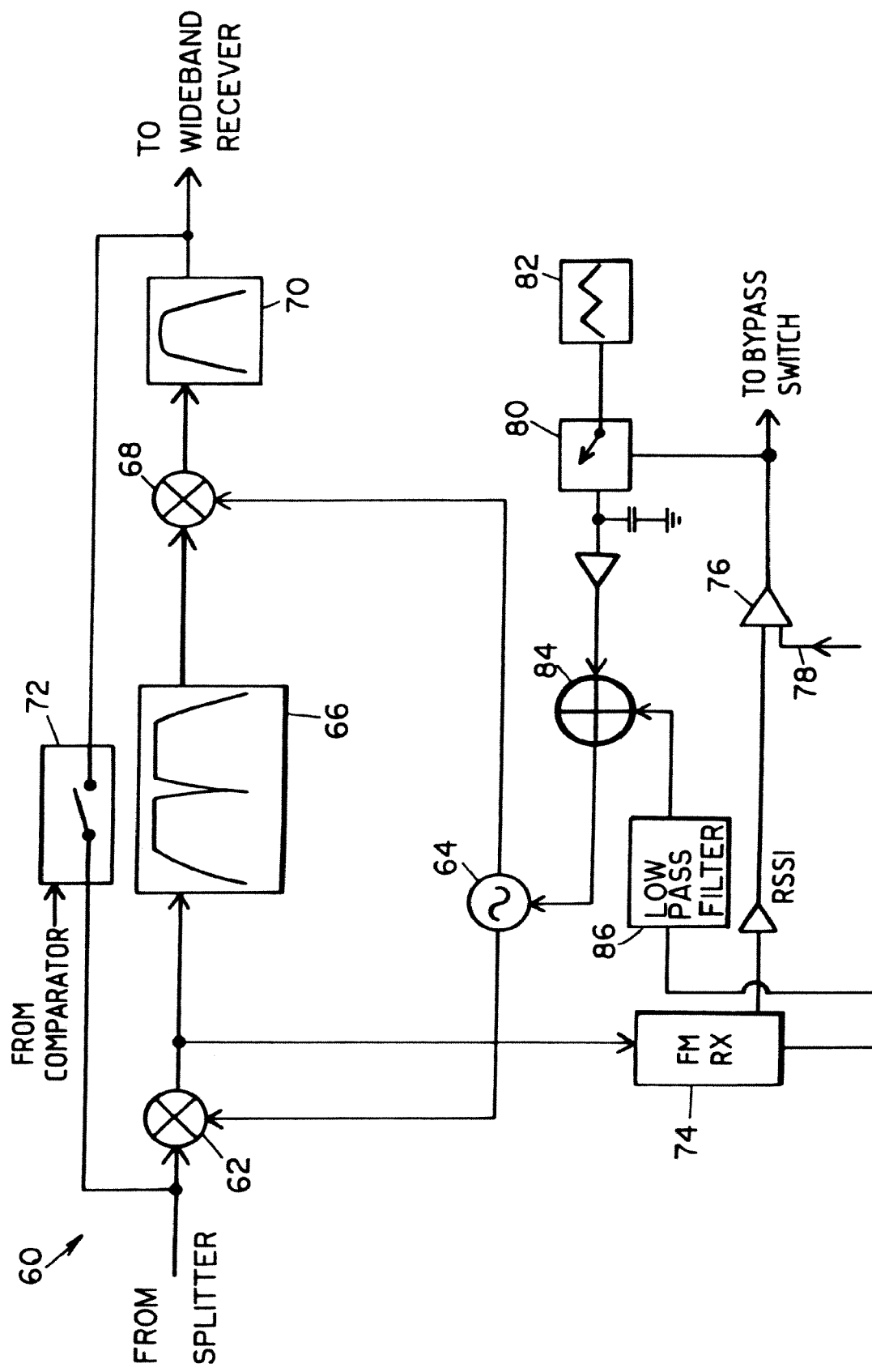
FIG. 6 is an exemplary illustration of one embodiment of an adaptive notch filter (ANF) module of FIG. 2.

In general, one embodiment of an ANF module 60, as shown in FIG. 6, scans the frequency spectrum of the signal provided by the splitter 24 and looks for narrowband interference therein. Such scanning may be implemented by scanning to various known narrowband channels that exist within the bandwidth of the wideband signal. For example, the ANF module 60 may scan to various AMPS channels that lie within the bandwidth of the wideband signal. Alternatively, all of the frequency spectrum encompassed by the wideband signal may be scanned. Either way, when narrowband interference is detected in the wideband signal, the ANF module 60 moves the narrowband interference into the notch of a notch filter, thereby filtering the wideband signal to remove the narrowband interference.

In particular, as shown in FIG. 6, the signal from the splitter 24 is coupled to a first mixer 62, which receives an additional input from a voltage controlled oscillator (VCO) 64. The first mixer 62 mixes the signal from the splitter 26 with the signal from the VCO 64, thereby shifting the frequency spectrum of the signal from the splitter 24 and putting a portion of the shifted frequency spectrum located at intermediate frequency (IF) into a notch frequency of a notch filter 66. Accordingly, the component of the frequency shifted signal that is at the IF is removed by the notch filter 66 having a notch frequency set at the IF.

The resulting filtered signal is coupled from the notch filter 66 to a second mixer 68, which is also driven by the VCO 64. The second mixer 68 mixes the notch filter output with the signal from the VCO 64 to shift the frequency spectrum of the filtered signal back to an original position that the signal from the splitter 24 had. The output of the second mixer 68 is coupled to a band pass filter 70, which removes any undesired image frequencies created by the second mixer 68.

In the system of FIG. 6, the narrowband interference present in the wideband signal is mixed to the IF, which is the notch frequency of the notch filter 66, by the first mixer 62 and is, therefore, removed by the notch filter 66. After the narrowband interference has been removed by the notch filter 66, the second mixer 68 restores the signal to its original frequency position, except that the narrowband interference has been removed. Collectively, the first mixer 62, the VCO 64, the notch filter 66, the second mixer 68 and the band pass filter may be referred to as an "up, down filter" or a "down, up filter."

The signal from the splitter 24 is also coupled to a bypass switch 72 so that if no narrowband interference is detected in the wideband signal from the splitter 24, the bypass switch 72 may be enabled to bypass the notch filter 66 and the mixers 62, 68, thereby passing the signal from the splitter 24 directly to the wideband receiver 30. Alternatively, if narrowband interference is detected, the bypass switch 72 is opened and the signal from the splitter 24 is forced to go through the notch filter 66.

To detect the presence of narrowband interference and to effectuate frequency scanning, a number of components are provided. A discriminator 74 receives the output signal from the first mixer 62 and detects signal strength at the IF using a received signal strength indicator (RSSI) that is tuned to the IF. The RSSI output of the discriminator 74 is coupled to a comparator 76, which also receives a threshold voltage on a line 78. When the RSSI signal from the discriminator 74 exceeds the threshold voltage on the line 78, the comparator 76 indicates that narrowband interference is present at the IF, which is the notch frequency of the notch filter 66. When narrowband interference is detected, the sweeping action of the VCO 64 is stopped so that the notch filter 66 can remove the interference at the IF.

To affect the sweeping action of the VCO 64, the output of the comparator 76 is coupled to a sample and hold circuit 80, which receives input from a voltage sweep generator 82. Generally, when no interference is detected by the comparator 76, the output of the voltage sweep generator 82 passes through the sample and hold circuit 80 and is applied to a summer 84, which also receives input from a low pass filter 86 that is coupled to the output of the discriminator 74. The summer 84 produces a signal that drives the VCO 64 in a closed loop manner. As the voltage sweep generator 82 sweeps its output voltage over time, the output of the summer 84 also sweeps, which causes the frequency output of the VCO 64 to sweep over time. The sweeping output of VCO 64, in conjunction with the discriminator 74 and the comparator 76, scan the signal from the splitter 24 for interference. As long as the comparator 76 indicates that narrowband interference is not present, the switch 72 is held closed, because there is no need to filter the signal from the splitter 24.

However, when the comparator 76 detects narrowband interference in the signal from the splitter 24 (i.e., when the RSSI exceeds the voltage on the line 78), the sample and hold circuit 80 samples the output of the voltage sweep generator 82 and holds the sampled voltage level, thereby providing a fixed voltage to the summer 84, which, in turn, provides a fixed output voltage to the VCO 64. Because a fixed voltage is provided to the VCO 64, the frequency output by the VCO 64 does not change and the signal from the splitter 24 is no longer scanned, but is frequency shifted so that the narrowband interference is moved to the IF, which is the notch frequency of the notch filter 66. Additionally, when the comparator 76 indicates that narrowband interference is present, the switch 72 opens and the only path for the signal from the splitter 24 to take is the path through the mixers 62, 68 and the notch filter 66.

The threshold voltage on the line 78 may be hand tuned or may be generated by filtering some received signal strength. Either way, the voltage on the line 78 should be set so that the comparator 76 does not indicate that interference is present when only a wideband signal, such as the signal shown in FIG. 3, is present, but only indicates interference when a signal having narrowband interference is present. For example, the frequency spectrum 42 shown in FIG. 4, shows three narrowband interferers 44, 46, 48, only one of the interferers would be needed for the comparator 76 to indicate the presence of narrowband interference. As will be readily appreciated, the embodiment shown in FIG. 6 is only able to select and filter a single narrowband interferer within a wideband signal.

Figure 7:
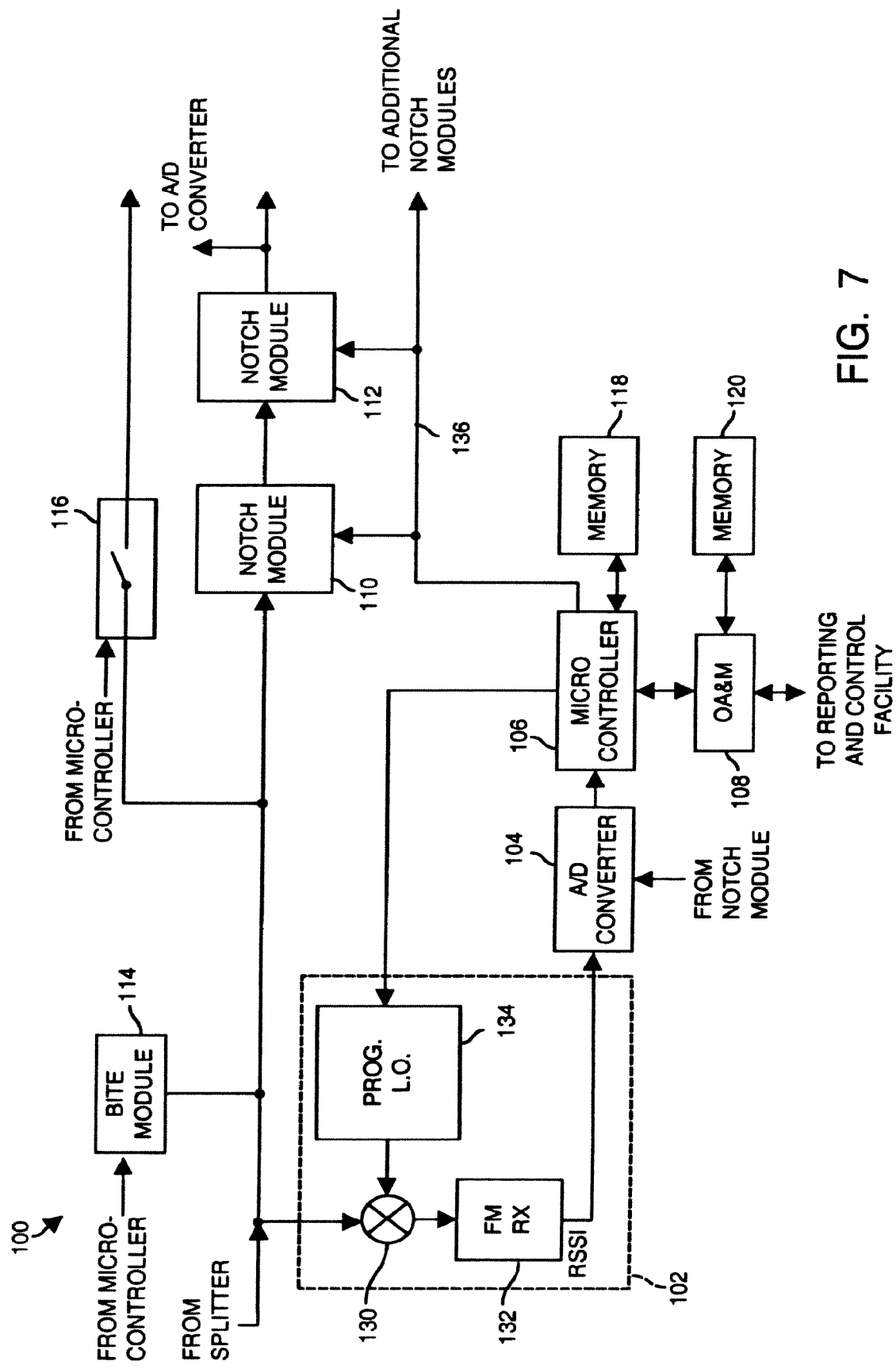
FIG. 7 is an exemplary illustration of a second embodiment of an ANF module of FIG. 2.

As shown in FIG. 7, a second embodiment of an ANF module 100, which may filter a number of narrowband interferers, generally includes a scanner 102, an analog to digital converter (A/D) 104, a microcontroller 106, an operations, alarms and metrics (OA&M) processor 108 and notch modules, two of which are shown in FIG. 7 at reference numerals 110 and 112. The microcontroller 106 and the OA&M processor 108 may be embodied in a model PIC 16C77-20P microcontroller, which is manufactured by Microchip Technology, Inc., and a model 80386 processor, which is manufactured by Intel Corp., respectively. Although they are shown and described herein as separate devices that execute separate software instructions, those having ordinary skill in the art will readily appreciate that the functionality of the microcontroller 106 and the OA&M processor 108 may be merged into a single processing device.

Additionally, the second embodiment of the ANF module 100 may include a built in test equipment (BITE) module 114 and a bypass switch 116, which may be embodied in a model AS239-12 gallium arsenide single-pole, double-throw switch available from Hittite. The microcontroller 106 and the OA&M processor 108 may be coupled to external memories 118 and 120, respectively.

In general, the scanner 102, which includes a mixer 130, a discriminator 132 and a programmable local oscillator 134, interacts with the A/D 104 and the microcontroller 106 to detect the presence of narrowband interference in the signal provided by the splitter 24. The mixer 130 and the programmable local oscillator 134 may be embodied in a model MD-54-0005 mixer available from M/A-Com and a model AD9831 direct digital synthesizer, which is manufactured by Analog Devices, Inc., respectively. Additionally, the A/D 104 may be completely integrated within the microcontroller 106 or may be a stand alone device coupled thereto.

As described in further detail below, once narrowband interference is detected in the signal from the splitter 24, the microcontroller 106, via serial bus 136, controls the notch modules 110, 112 to remove the detected narrowband interference. Although the second embodiment of the ANF module 100, as shown in FIG. 7, includes two notch modules 110, 112, additional notch modules may be provided in the ANF module 100. The number of notch modules that may be used in the ANF module 100 is only limited by the signal degradation that each notch module contributes. Because multiple notch modules are provided, multiple narrowband interferers may be removed from the wideband signal from the splitter 24. For example, if three notch modules were provided, a wideband signal having the frequency spectrum 42, as shown in FIG. 4, may be processes by the ANF module 110 to produce a filtered wideband signal having the frequency spectrum 50, as shown in FIG. 5.

The scanner 102 performs its function as follows. The signal from the splitter 24 is coupled to the mixer 130, which receives an input from the programmable local oscillator 134. The mixer 130 mixes the signals from the splitter 24 down to an IF, which is the frequency that the discriminator 132 analyses to produce an RSSI measurement that is coupled to the A/D 104. The A/D 104 converts the RSSI signal from an analog signal into a digital signal that may be processed by the microcontroller 106. The microcontroller 106 compares the output of the A/D 104 to an adaptive threshold that the microcontroller 106 has previously determined Details regarding how the microcontroller 106 determines the adaptive threshold are provided hereinafter. If the microcontroller 106 determines that the output from the A/D 104, which represents RSSI, exceeds the adaptive threshold, one of the notch modules 110, 112 may be assigned to filter the signal from the splitter 24 at the IF having an RSSI that exceeds the adaptive threshold.

The microcontroller 106 also programs the programmable local oscillator 134 so that the mixer 130 moves various portions of the frequency spectrum of the signal from the splitter 24 to the IF that the discriminator 132 processes. For example, if there are 59 narrowband channels that lie within the frequency band of a particular wideband channel, the microcontroller 106 will sequentially program the programmable local oscillator 134 so that each of the 59 channels is sequentially mixed down to the IF by the mixer 132 so that the discriminator 132 can produce RSSI measurements for each channel. Accordingly, the microcontroller 106 uses the programmable local oscillator 134, the mixer 130 and the discriminator 132 to analyze the signal strengths in each of the 60 narrowband channels lying within the frequency band of the wideband signal. By analyzing each of the channels that lie within the frequency band of the wideband signal, the microcontroller 106 can determine an adaptive threshold and can determine whether narrowband interference is present in one or more of the narrowband channels.

Once channels having narrowband interference are identified, the microcontroller 106 may program the notch modules 110, 112 to remove the most damaging interferers, which may, for example, be the strongest interferers. As described in detail hereinafter, the microcontroller 106 may also store lists of channels having interferers, as well as various other parameters. Such a list may be transferred to the reporting and control facility or a base station, via the OA&M processor 108, and may be used for system diagnostic purposes.

Diagnostic purposes may include, but are not limited to, controlling the narrowband receiver 28 to obtain particular information relating to an interferer and retasking the interferer by communicating with its base station. For example, the reporting and control facility may use the narrowband receiver 28 to determine the identity of an interferer, such as a mobile unit, by intercepting the electronic serial number (ESN) of the mobile unit, which is sent when the mobile unit transmits information on the narrowband channel. Knowing the identity of the interferer, the reporting and control facility may contact infrastructure that is communicating with the mobile unit and may request the infrastructure to change the transmit frequency of the mobile unit (i.e., the frequency of the narrowband channel on which the mobile unit is transmitting) or may request the infrastructure to drop communications with the interfering mobile unit all together.

Additionally, diagnostic purposes may include using the narrowband receiver 28 to determine a telephone number that the mobile unit is attempting to contact and, optionally handling the call. For example, the reporting and control facility may use the narrowband receiver 28 to determine that the user of the mobile unit was dialing 911, or any other emergency number, and may, therefore, decide that the narrowband receiver 28 should be used to handle the emergency call by routing the output of the narrowband receiver 28 to a telephone network.

Figure 8:
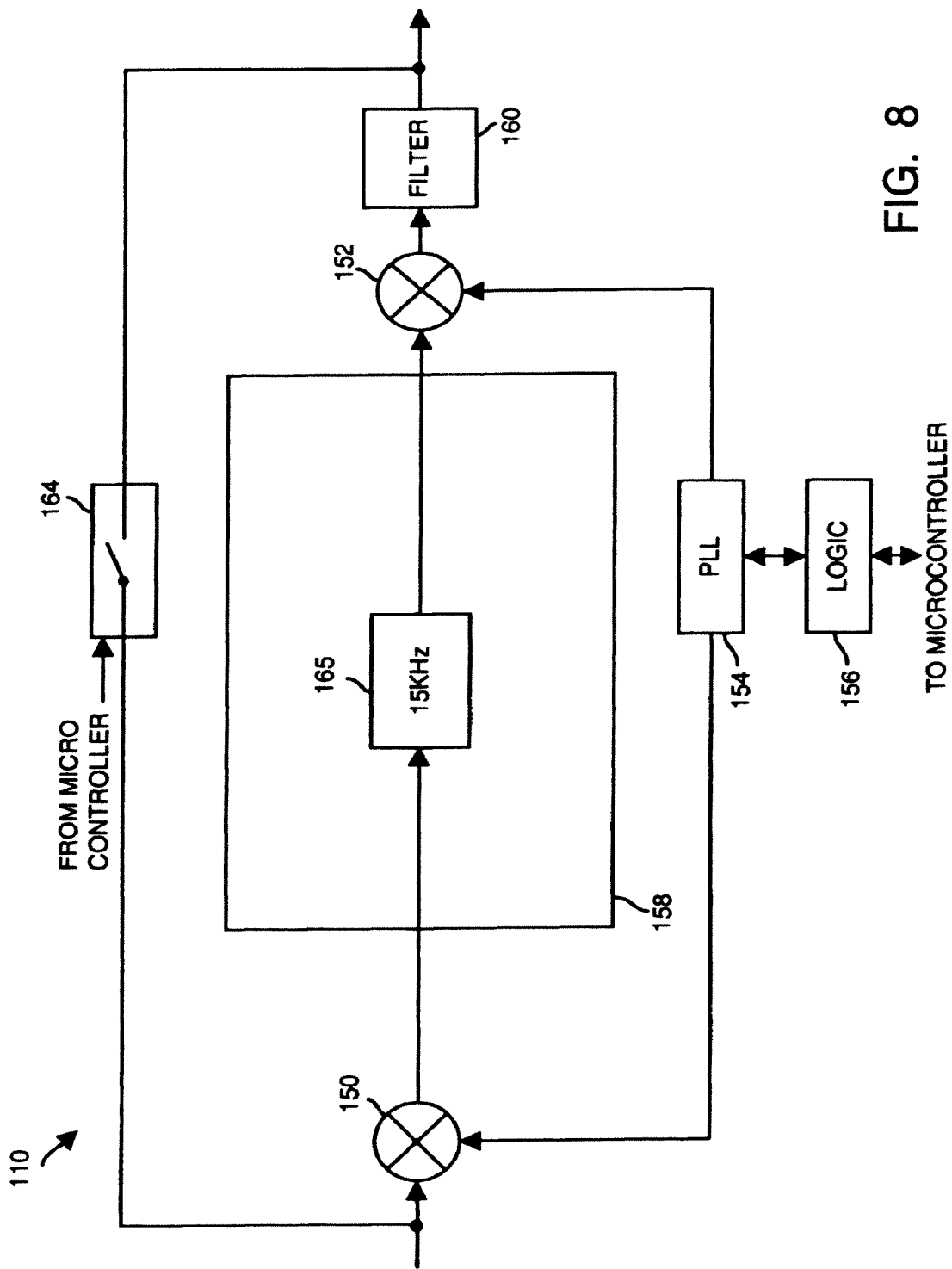
FIG. 8 is an exemplary illustration of a notch module of FIG. 7.

FIG. 8 reveals further detail of one of the notch modules 110, it being understood that any other notch modules used in the ANF module 100 may be substantially identical to the notch module 110. In general, the notch module 110 is an up, down or down, up filter having operational principles similar to the ANF module 60 described in conjunction with FIG. 6. In particular, the notch module 110 includes first and second mixers 150, 152, each of which receives an input signal from a phase locked loop (PLL) 154 that is interfaced through a logic block 156 to the serial bus 136 of the microcontroller 106. Disposed between the mixers 150, 152 is a notch filter block 158, further detail of which is described below. In practice, the mixers 150, 152 may be embodied in model MD54-0005 mixers that are available from M/A-Com and the PLL 154 may be embodied in a model LMX2316™ frequency synthesizer that is commercially available from National Semiconductor.

During operation of the ANF module 100, the microcontroller 106 controls the PLL 154 to produce an output signal that causes the first mixer 150 to shift the frequency spectrum of the signal from the splitter 24 to an IF, which is the notch frequency of the notch filter block 158. Alternatively, in the case of cascaded notch modules, the notch module may receive its input from another notch module and not from the splitter 24. The output of the PLL 154 is also coupled to the second mixer to shift the frequency spectrum of the signal from the notch filter block 158 back to its original position as it was received from the splitter 24 after the notch filter block 158 has removed narrowband interference therefrom. The output of the second mixer 152 is further coupled to a filter 160 to remove any undesired image frequencies that may be produced by the second mixer 152. The output of the filter 160 may be coupled to an additional notch module (e.g., the notch module 112) or, if no additional notch modules are used, may be coupled directly to the wideband receiver 30.

Additionally, the notch module 110 includes a bypass switch 164 that may be used to bypass the notch module 110 in cases where there is no narrowband interference to be filtered or in the case of a notch module 110 failure. For example, the microcontroller 106 closes the bypass switch 164 when no interference is detected for which the notch module 110 is used to filter. Conversely, the microcontroller 106 opens the bypass switch 164 when interference is detected and the notch module 110 is to be used to filter such interference.

As shown in FIG. 8, the notch filter block 158 includes a filter 165, which may be, for example a filter having a reject band that is approximately 15 KHz wide at −40 dB. The reject band of the filter 165 may be fixed at, for example, a center frequency of 150 MHz or at any other suitable frequency at which the IF of the mixer 150 is located.

Figure 9:
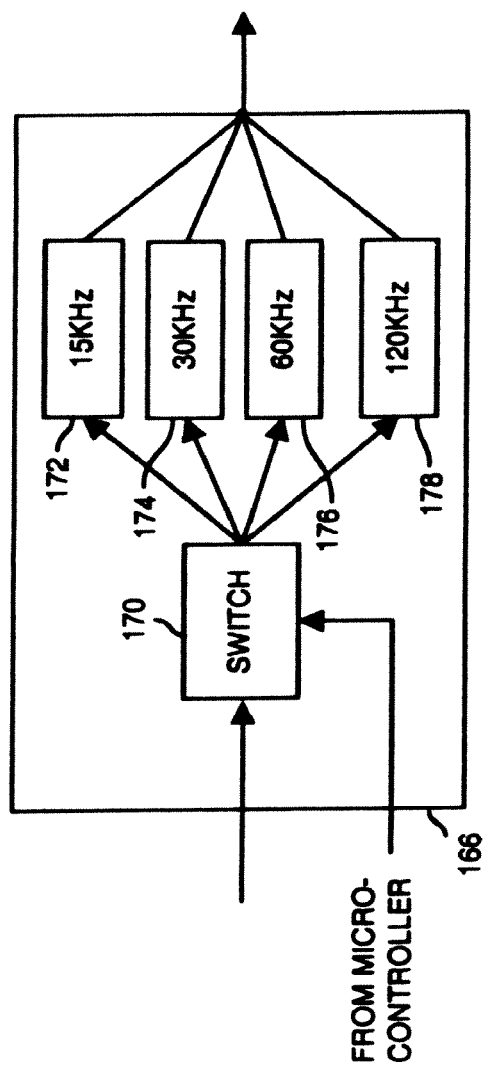
FIG. 9 is an exemplary illustration of a second embodiment of a notch filter block of FIG. 8.

Although the notch filter block 158 of FIG. 8 shows only a single filter 165, as shown in FIG. 9, a second embodiment of a notch filter block 166 may include a switch 170 and multiple filters 172-178. In such an arrangement, each of the filters 172-178 has a notch frequency tuned to the IF produced by the first mixer 150. Additionally, each of the filters 172-178 may have a different reject bandwidth at −40 dB. For example, as shown in FIG. 9, the filters 172-178 have reject bandwidths of 15 KHz to 120 KHz. The use of filters having various reject bandwidths enables the ANF module 100 to select a filter having an optimal reject bandwidth to best filter an interferer.

During operation, of the second embodiment of the notch filter block 166, the microcontroller 106 controls the switch 170 to route the output signal from the first mixer 150 to one of the filters 172-178. The microcontroller 106, via the switch 170, selects the filter 172-178 having a notch switch best suited to filter interference detected by the microcontroller 106. For example, if the microcontroller 106 determines that there is interference on a number of contiguous channels, the microcontroller 106 may use a filter 172-178 having a notch width wide enough to filter all such interference, as opposed to using a single filters to filter interference on each individual channel. Additionally, a single filter having a wide bandwidth may be used when two narrowband channels having interference are separated by a narrowband channel that does not have narrowband interference. Although the use of a single wide bandwidth filter will filter a narrowband channel not having interference thereon, the wideband signal information that is lost is negligible.

Having described the detail of the hardware aspects of the system, attention is now turned to the software aspects of the system. Of course, it will be readily understood by those having ordinary skill in the art that software functions may be readily fashioned into hardware devices such as, for example, application specific integrated circuits (ASICs). Accordingly, while the following description pertains to software, such a description is merely exemplary and should not be considered limiting in any way.

That being said, FIGS. 10-15 include a number of blocks representative of software or hardware functions or routines. If such blocks represent software functions, instructions embodying the functions may be written as routines in a high level language such as, for example, C, or any other suitable high level language, and may be compiled into a machine readable format. Alternatively, instructions representative of the blocks may be written in assembly code or in any other suitable language. Such instructions may be stored within the microcontroller 106 or may be stored within the external memory 118 and may be recalled therefrom for execution by the microcontroller 106.

Figure 10:
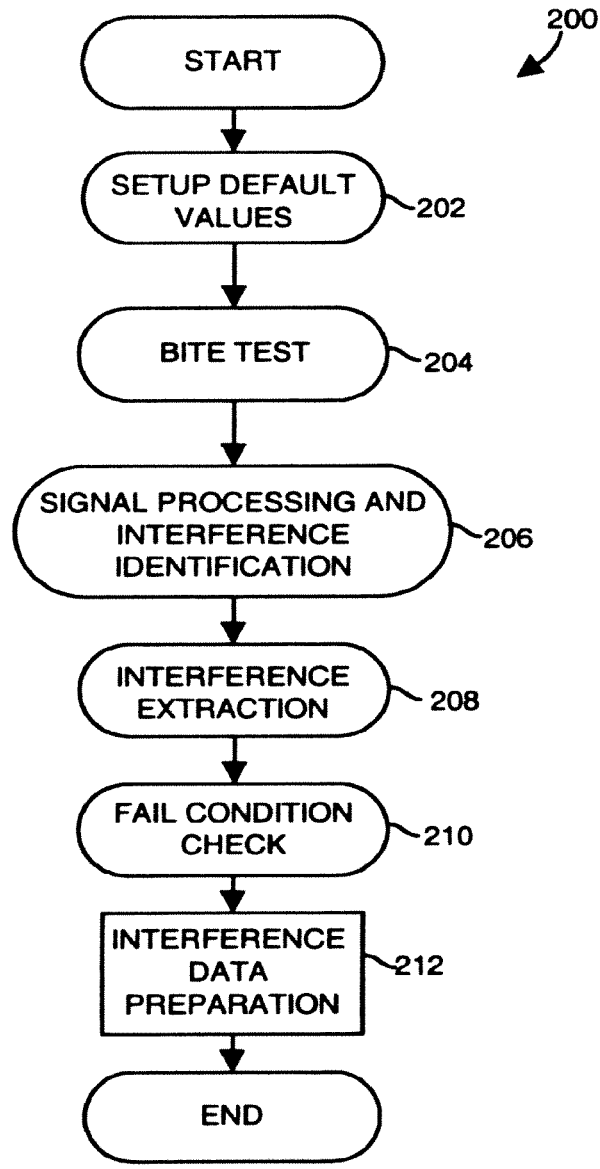
FIG. 10 is an exemplary flow diagram of a main routine executed by the microcontroller of FIG. 7.

A main routine 200, as shown in FIG. 10, includes a number of blocks or routines that are described at a high level in connection with FIG. 10 and are described in detail with respect to FIGS. 11-15. The main routine 200 begins execution at a block 202 at which the microcontroller 102 sets up default values and prepares to carry out the functionality of the ANF module 100. After the setup default values function is complete, control passes to a block 204, which performs a built-in test equipment (BITE) test of the ANF module 100.

After the BITE test has been completed, control passes from the block 204 to a block 206, which performs signal processing and interference identification. After the interference has been identified at the block 206, control passes to a block 208 where the identified interference is extracted from the wideband signal received by the ANF module 100.

After the interference has been extracted at the block 208, control passes to a block 210 at which a fail condition check is carried out. The fail condition check is used to ensure that the ANF module 100 is operating in a proper manner by checking for gross failures of the ANF module 100.

After the fail condition check completes, control passes from the block 210 to a block 212, which performs interference data preparation that consists of passing information produced by some of the blocks 202-210 from the microcontroller 106 to the OA&M 108. Upon completion of the interference data preparation, the main routine 200 ends its execution. The main routine 200 may be executed by the microcontroller 106 at time intervals such as, for example, every 20 ms.

Figure 11:
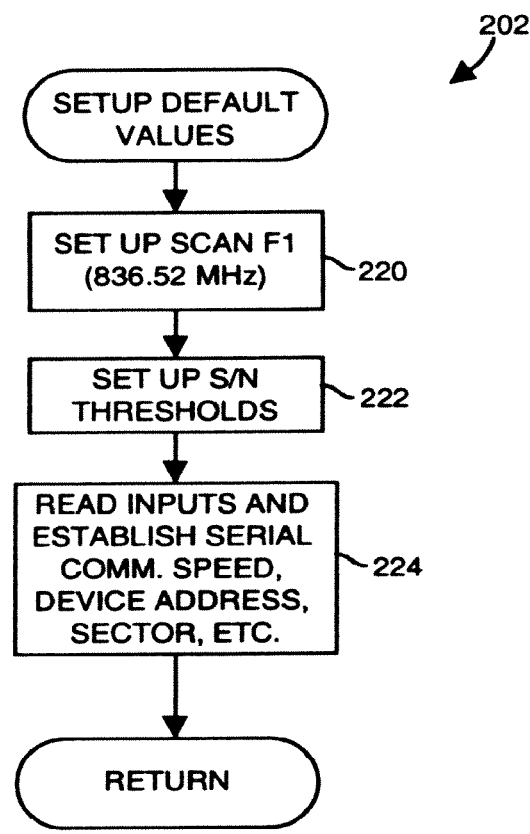
FIG. 11 is an exemplary flow diagram of a setup default values routine executed by the microcontroller of FIG. 7.

As shown in FIG. 11, the setup default values routine 202 begins execution at a block 220 at which the microcontroller 106 tunes the programmable local oscillator 134 to scan for interference on a first channel designated as F1. For example, as shown in FIG. 11, F1 may be 836.52 megahertz (MHz). Alternatively, as will be readily appreciated by those having ordinary skill in the art, the first channel to which the ANF module 100 is tuned may be any suitable frequency that lies within the frequency band or guard band of a wideband channel.

After the microcontroller 106 is set up to scan for interference on a first frequency, control passes from the block 220 to a block 222, which sets up default signal to noise thresholds that are used to determine the presence of narrowband interference in wideband signals received from the splitter 24 of FIG. 2. Although subsequent description will provide detail on how adaptive thresholds are generated, the block 222 merely sets up an initial threshold for determining presence of narrowband interference.

After the default thresholds have been set at the block 222 control passes to a block 224 at which the microcontroller 106 reads various inputs, establishes serial communication with the notch modules 110, 112 and any other serial communication devices, as well as establishes communications with the OA&M processor 108. After the block 224 completes execution, the setup default values routine 202 returns control to the main program and the block 204 is executed.

Figure 12:
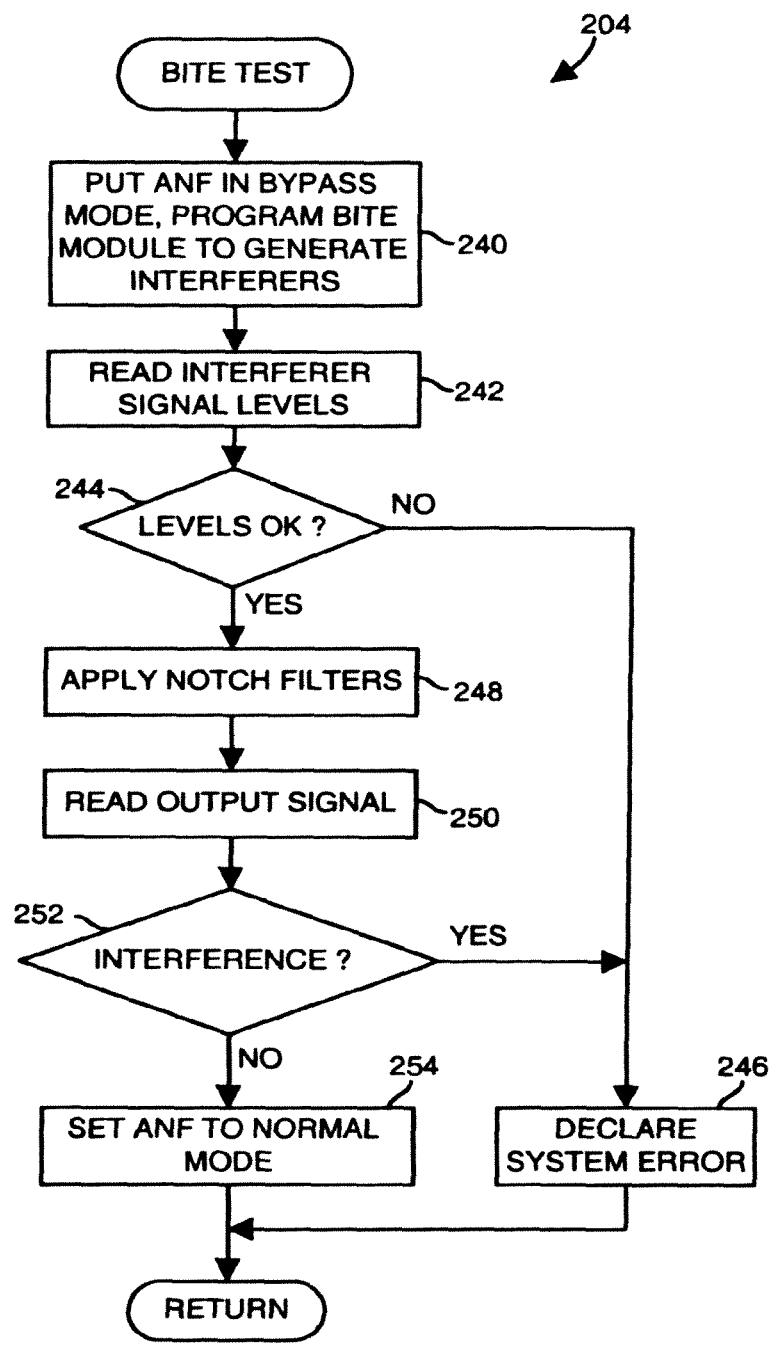
FIG. 12 is an exemplary flow diagram of a built in test equipment (BITE) test routine executed by the microcontroller of FIG. 7.

FIG. 12 reveals further detail of the BITE test routine 204, which begins execution after the routine 202 completes. In particular, the BITE test routine 204 begins execution at a block 240, at which the microcontroller 106 puts the notch modules 110, 112 in a bypass mode by closing their bypass switches 190. After the notch modules 110, 112 have been bypassed, the microcontroller 106 programs the BITE module 114 to generate interferers that will be used to test the effectiveness of the notch modules 110, 112 for diagnostic purposes. After the notch modules 110, 112 have been bypassed and the BITE module 114 is enabled, control passes from the block 240 to a block 242.

At the block 242, the microcontroller 106 reads interferer signal levels at the output of the notch module 112 via the A/D 104. Because the notch modules 110, 112 have been bypassed by the block 240, the signal levels at the output of the notch module 112 should include the interference that is produced by the BITE module 114.

After the interferer signal levels have been read at the block 242, a block 244 determines whether the read interferer levels are appropriate. Because the notch modules 110, 112 have been placed in bypass mode by the block 240, the microcontroller 106 expects to see interferers at the output of the notch module 112. If the levels of the interferer detected at the output of the notch module 112 are not acceptable (i.e., are too high or too low), control passes from the block 244 to a block 246 where a system error is declared. Declaration of a system error may include the microcontroller 106 informing the OA&M processor 108 of the system error. The OA&M processor 108, in turn, may report the system error to a reporting and control facility. Additionally, declaration of a system error may include writing the fact that a system error occurred into the external memory 118 of the microcontroller 106.

Alternatively, if the block 244 determines that the interferer levels are appropriate, control passes from the block 244 to a block 248 at which the microcontroller 106 applies one or more of the notch modules, 110, 112. After the notch modules 110, 112 have been applied (i.e., not bypassed) by the block 248, control passes to a block 250, which reads the signal level at the output of the notch module 112. Because the BITE module 114 produces interference at frequencies to which the notch filters are applied by the block 248, it is expected that the notch modules 110, 112 remove such interference.

After the signal levels are read by the block 250, control passes to a block 252, which determines if interference is present. If interference is present, control passes from the block 252 to the block 246 and a system error is declared because one or more of the notch modules 110, 112 are not functioning properly because the notch modules 110, 112 should be suppressing the interference generated by the BITE module 114. Alternatively, if no interference is detected at the block 252, the ANF module 100 is functioning properly and is, therefore, set to a normal mode of operation at a block 254. After the block 254 or the block 246 have been executed, the BITE test routine 204 returns control to the main program 200, which begins executing the block 206.

Figure 13:
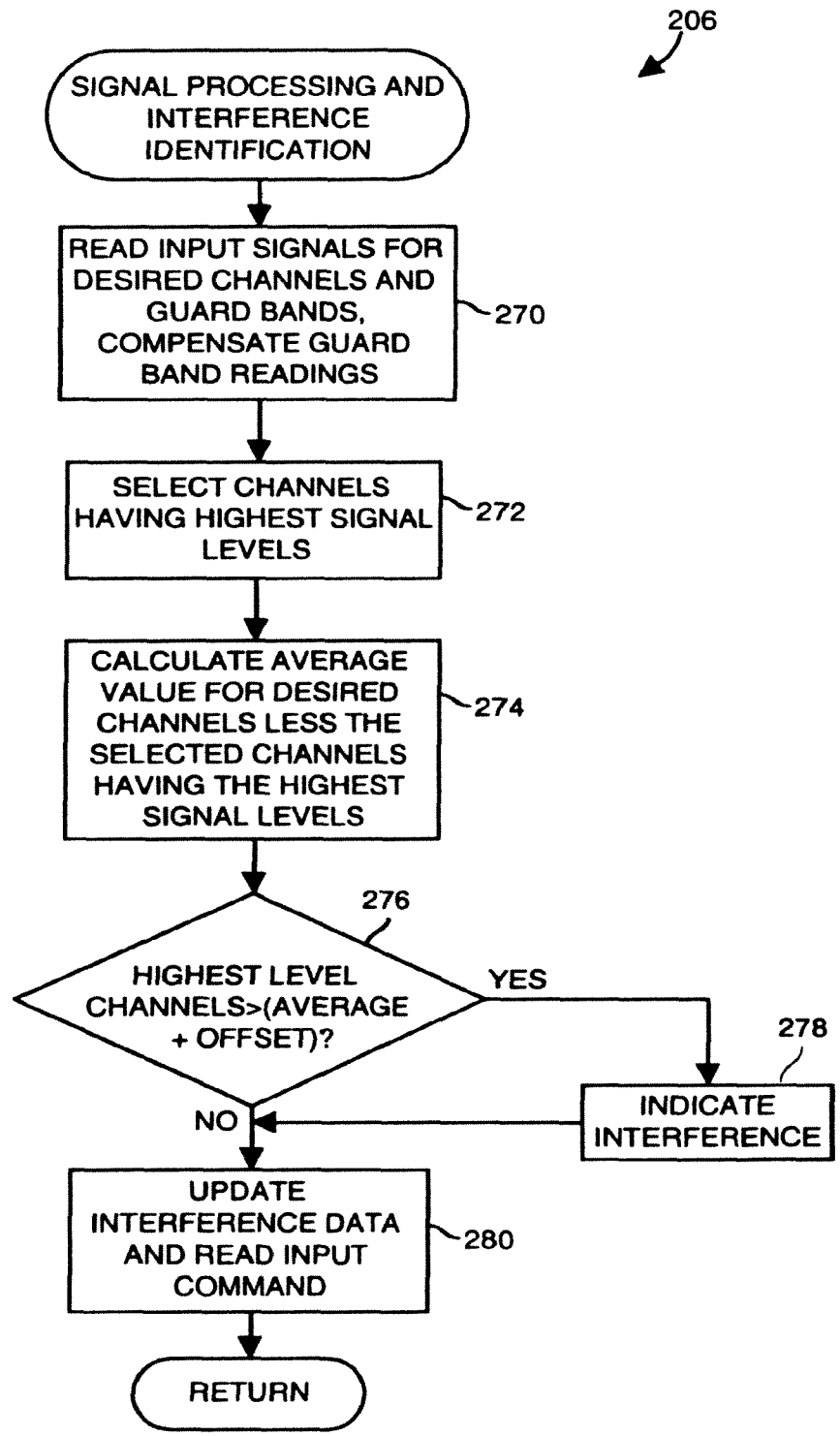
FIG. 13 is an exemplary flow diagram of a signal processing and interference identification routine executed by the microcontroller of FIG. 7.

As shown in FIG. 13, the signal processing and interference identification routine 206 begins execution at a block 270. At the block 270, the microprocessor 106 controls the programmable local oscillator 134 so that the microcontroller 106 can read signal strength values for each of the desired channels via the discriminator 132 and the A/D 104. In particular, the microcontroller 106 may control the programmable local oscillator 134 to tune sequentially to a number of known channels. The tuning moves each of the known channels to the IF so that the discriminator 132 can make an RSSI reading of the signal strength of each channel. Optionally, if certain channels have a higher probability of having interference than other channels, the channels having the higher probability may be scanned first. Channels may be determined to have a higher probability of having interference based on historical interference patters or interference data observed by the ANF module 100.

Additionally, at the block 270, the microcontroller 106 controls the programmable local oscillator 134 to frequency shift portions of the guard bands to the IF so that the discriminator 132 can produce RSSI measurements of the guard bands. Because the guard bands are outside of a frequency response of a filter disposed within the wideband receiver 30, the block 270 compensates guard band signal strength reading by reducing the values of such readings by the amount that the guard bands will be attenuated by a receiver filter within the wideband receiver 30. Compensation is carried out because the ANF module 100 is concerned with the deleterious effect of narrowband signals on the wideband receiver 30. Accordingly, signals having frequencies that lie within the passband of the filter of the wideband receiver 30 do not need to be compensated and signals falling within the guard band that will be filtered by the receive filter of the wideband receiver 30 need to be compensated. Essentially, the guard band compensation has a frequency response that is the same as the frequency response of the wideband receiver filter. For example, if a wideband receiver filter would attenuate a particular frequency by 10 dB, the readings of guard bands at that particular frequency would be attenuated by 10 dB.

After the block 270 is completed, control passes to a block 272, which selects a number of channels having the highest signal levels. Commonly, the number of channels that will be selected by the block 272 corresponds directly to the number of notch modules, 110, 112 that are employed by a particular ANF module 100. After the channels having the highest signal levels are selected by the block 272, control passes from the block 272 to a block 274.

At the block 274, the microcontroller 106 determines an adaptive threshold by calculating an average signal strength value for the desired channels read by the block 270. However, the average is calculated without considering the channels having the highest signal levels that were selected by the block 272. Alternatively, it would be possible to calculate the average by including the signal levels selected by the block 272. The block 274 calculates an average that will be compensated by an offset and used to determine whether narrowband interference is present on any of the desired channels read by the block 270.

After the block 274 completes execution control passes to a block 276, which compares the signal strength values of the channels selected by the block 272 to the adaptive threshold, which is the sum of the average calculated by the block 274 threshold and an offset. If the selected channels from the block 272 have signal strengths that exceeds the adaptive threshold, control passes to a block 278.

The block 278 indicates the channels on which interference is present based on the channels that exceeded the adaptive threshold. Such an indication may be made by, for example, writing information from the microcontroller 106 to the external memory 118, which is passed to the OA&M processor 108. After the interferers have been indicated by the block 278, control passes to a block 280. Additionally, if none of the channels selected by the block 272 have signal strengths that exceed the adaptive threshold, control passes from the block 276 to the block 280.

At the block 280, the microcontroller 106 updates an interference data to indicate on which channels interferers were present. In particular, each frame (e.g., 20 ms) the microcontroller 106 detects interferers by comparing power levels (RSSI) on a number of channels to the threshold level. When an inteferer is detected, data for that interferer is collected for the entire time that the interferer is classified as an interferer (i.e., until the RSSI level of the channel falls below the threshold for a sufficient period of time to pass the hang time test that is described below). All of this information is written to a memory (e.g., the memory 118 or 120), to which the OA&M processor 108 has access. As described below, the OA&M processor 108 processes this information to produce the interference report.

Additionally, the block 280 reads input commands that may be received from the OA&M processor 108. Generally, such commands may be used to perform ANF module 100 configuration and measurement. In particular, the commands may be commands that put the ANF module 100 in various modes such as, for example, a normal mode, a test mode in which built in test equipment is employed or activated, or a bypass mode in which the ANF module 100 is completely bypassed. Additionally, commands may be used to change identifying characteristics of the ANF module 100. For example, commands may be used to change an identification number of the ANF module 100, to identify the type of equipment used in the ANF module 100, to identify the geographical location of the ANF module 100 or to set the time and date of a local clock within the ANF module 100. Further, commands may be used to control the operation of the ANF module 100 by, for example, adding, changing or deleting the narrowband channels over which the ANF module 100 is used to scan or to change manually the threshold at which a signal will be classified as an interferer. Further, the attack time and the hang time, each of which is described below, may be changed using commands. Additionally, a command may be provided to disable the ANF module 100.

After the block 280 has completed execution, the signal processing and interference identification routine 260 returns control back to the main routine 200, which continues execution at the block 208.

Figure 14:
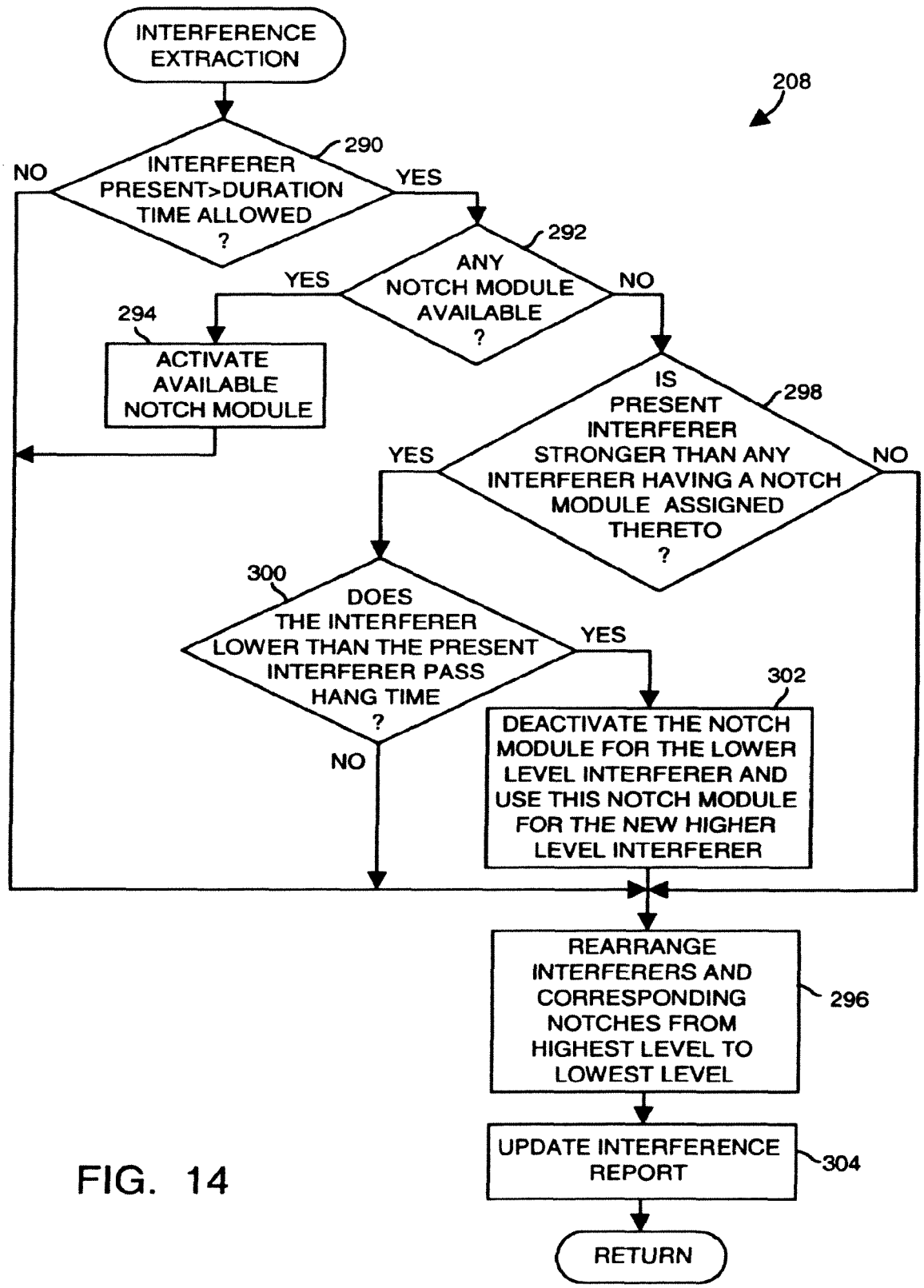
FIG. 14 is an exemplary flow diagram of an interference extraction routine executed by the microcontroller of FIG. 7.

As shown in FIG. 14, the interference extraction routine 208 begins execution at a block 290, which compares the time duration that an interferer has been present with a reference time called "duration time allowed," which may also be referred to as "attack time." If the interferer has been present longer than the attack time, control passes to a block 292. Alternatively, if the interferer has not been present longer than the duration time allowed, control passes to a block 296, which is described in further detail below. Essentially, the block 290 acts as a hysteresis function that prevents filters from being assigned to temporary interferers immediately as such interferers appear. Typically, the duration time allowed may be on the order of 20 milliseconds (ms), which is approximately the frame rate of a CDMA communication system. As will be readily appreciated by those having ordinary skill in the art, the frame rate is the rate at which a base station and a mobile unit exchange data. For example, if the frame rate is 20 ms, the mobile unit will receive a data burst from the base station every 20 ms. The block 90 accommodates mobile units that are in the process of initially powering up. As will be appreciated by those having ordinary skill in the art, mobile units initially power up with a transmit power that is near the mobile unit transmit power limit. After the mobile unit that has initially powered up establishes communication with a base station, the base station may instruct the mobile unit to reduce its transmit power. As the mobile unit reduces its transmit power, the mobile unit may cease to be an interference source to a base station having an ANF module. Accordingly, the block 290 prevents the ANF module 100 from assigning a notch module 110, 112 to an interferer that will disappear on its own within a short period of time.

At the block 292, the microcontroller 106 determines whether there are any notch modules 110, 112 that are presently not used to filter an interferer. If there is a notch module available, control passes from the block 292 to a block 294, which activates an available notch module and tunes that notch module to filter the interferer that is present in the wideband signal from the splitter 24. After the block 294 has completed execution, control passes to the block 296, which is described below.

If, however, the block 292 determines that there are no notch modules available, control passes from the block 292 to a block 298, which determines whether the present interferer is stronger than any interferer to which a notch module is presently assigned. Essentially, the block 298 prioritizes notch modules so that interferers having the strongest signal levels are filtered first. If the block 298 determines that the present interferer is not stronger than any other interferer to which a notch module is assigned, control passes from the block 298 to the block 296.

Alternatively, if the present interferer is stronger than an interferer to which a notch module is assigned, control passes from the block 298 to a block 300. The block 300 determines whether the interferer that is weaker than the present interferer passes a hang time test. The hang time test is used to prevent the ANF module 100 from deassigning a notch module 110, 112 from an interferer when the interferer is in a temporary fading situation. For example, if a mobile unit is generating interference and a notch module 110, 112 has been assigned to filter that interference, when the mobile unit enters a fading situation in which the interference level is detected at an ANF module 100 becomes low, the ANF module 100 does not deassign the notch module being used to filter the fading interference until the interference has not been present for a time referred to as hang time. Essentially, hang time is a hysteresis function that prevents notch modules from being rapidly deassigned from interferers that are merely temporarily fading and that will return after time has passed. Hang time may be on the order of milliseconds of seconds. Accordingly, if the interferer that is weaker than the present interferer passes hang time, control passes to a block 302. Alternatively, if the interferer weaker than the present interferer does not pass hang time, the block 300 passes controlled to the block 296.

At the block 302, the microcontroller 106 deactivates the notch module being used to filter the weaker interferer and reassigns that same notch module to the stronger interferer. After the block 302 has completed the reassignment of the notch module, control passes to the block 296.

At the block 296, the microcontroller 106 rearranges interferers from lowest level to highest level and assigns notches to the highest level interferers. As with the block 298, the block 296 performs prioritizing functions to ensure that the strongest interferers are filtered with notch modules. Additionally, the block 296 may analyze the interference pattern detected by the ANF module 100 and may assign filters 172-178 having various notch widths to filter interferers. For example, if the ANF module 100 detects interference on contiguous channels collectively have a bandwidth of 50 KHz, the 50 KHz filter 176 of the notch filter block 158 may be used to filter such interference, rather than using four 15 KHz filters. Such a technique essentially frees up notch filter modules 110, 112 to filter additional interferers.

After the block 296 has completed execution, control passes to a block 304, which updates interference data by sending a list of channels and their interference status to a memory (e.g., the memory 118 or 120) that may be accessed by the OA&M processor 108. After the block 304 has completed execution, the interference extraction routine 208 returns control to the main module 200, which continues execution at the block 210.

Figure 15:
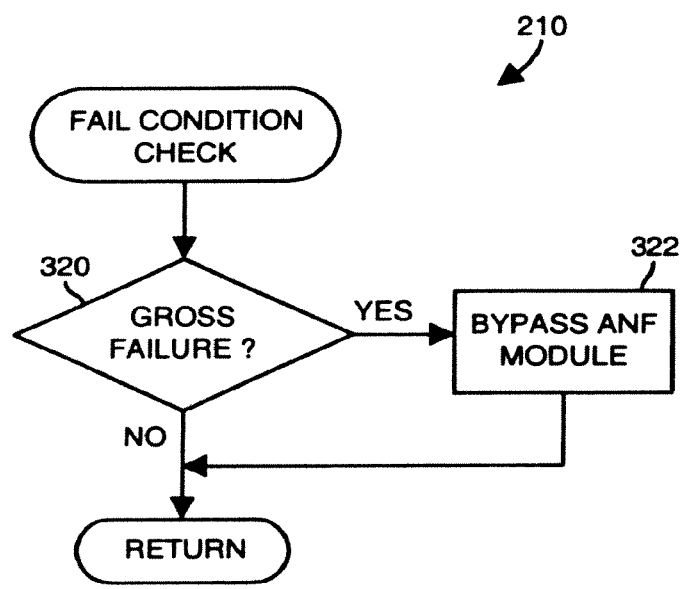
FIG. 15 is an exemplary flow diagram of a fail condition check routine executed by the microcontroller of FIG. 7.

At the block 210, as shown in FIG. 15, the microcontroller 106 determines if a gross failure has occurred in the ANF module 100. Such a determination may be made by, for example, determining if a voltage output from a voltage regulator of the ANF module 100 has an appropriate output voltage. Alternatively, gross failures could be determined by testing to see if each of the notch modules 110, 112 are inoperable. If each of the notch modules is inoperable, it is likely that a gross failure of the ANF module 100 has occurred. Either way, if a gross failure has occurred, control passes from the block 320 to a block 322 at which point the microcontroller 106 enables the bypass switch 116 of FIG. 7 to bypass all of the notch modules 110, 112 of the ANF module 100, thereby effectively connecting the splitter 24 directly to the wideband receiver 30. After the execution of the block 322, or if the block 320 determines that a gross failure has not occurred, control passes back to the main routine 200, which continues execution at the block 212. At the block 212, the interference data that was written to the memory 118 or 120, is passed to the OA&M processor 108.

Having described the functionality of the software that may be executed by the microcontroller 106, attention is now turned to the OA&M processor 108 of FIG. 7. If the blocks shown in FIG. 16 represent software functions, instructions embodying the functions may be written as routines in a high level language such as, for example, C, or any other suitable high level language, and may be compiled into a machine readable format. Alternatively, instructions representative of the blocks may be written in assembly code or in any other suitable language. Such instructions may be stored within the OA&M processor 108 or may be stored within the external memory 120 and may be recalled therefrom for execution by the OA&M controller 108.

Figure 16A:
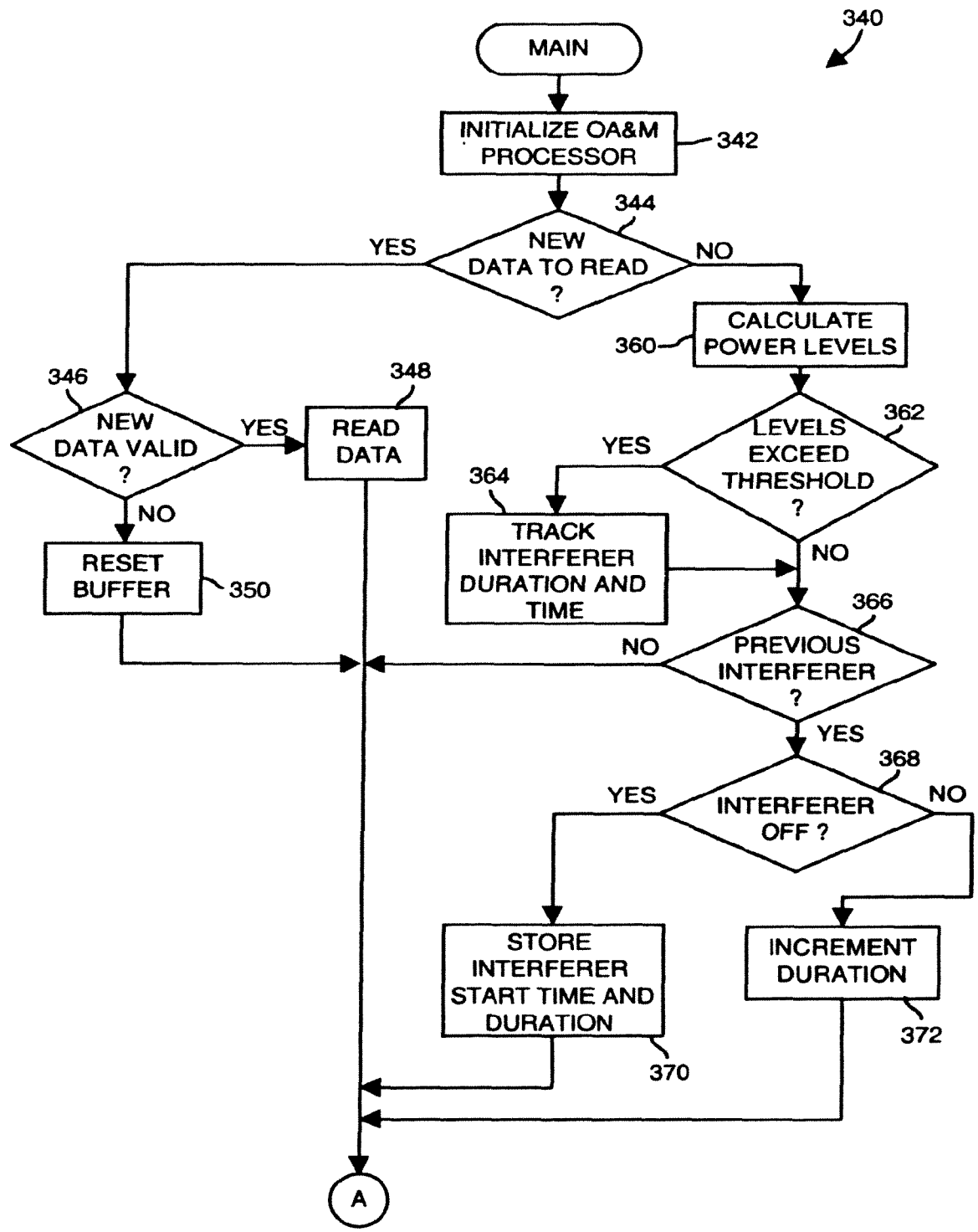
FIGS. 16A and 16B form an exemplary flow diagram of a main routine executed by the operations, alarms and metrics (OA&M) processor of FIG. 7.
Figure 16B:
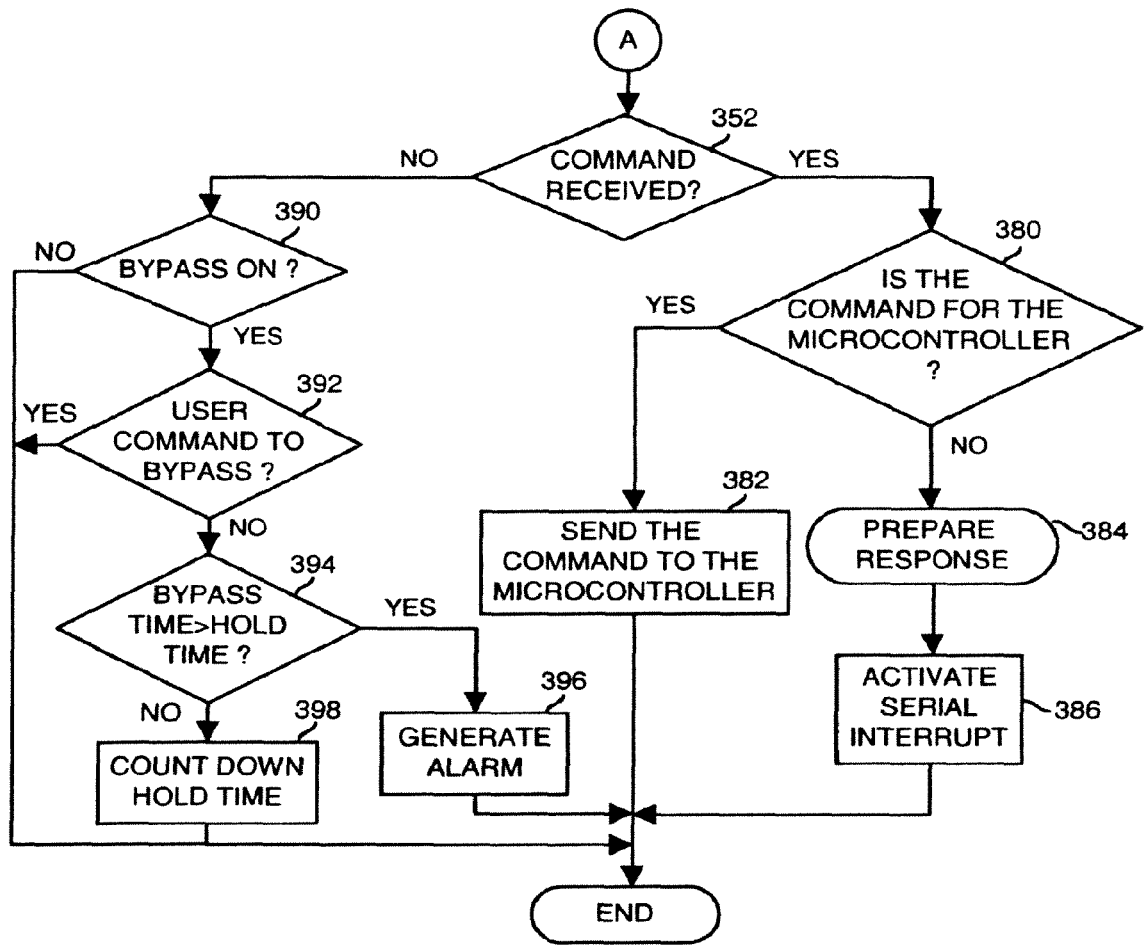

In particular, as shown in FIGS. 16A and 16B, which are referred to herein collectively as FIG. 16, a main routine 340 executed by the OA&M processor 108 may begin execution at a block 342, at which the OA&M processor 108 is initializes itself by establishing communication, checking alarm status and performing general housekeeping tasks. At the block 342, the OA&M processor 108 is initialized and passes control to a block 344.

At the block 344, the OA&M processor 108 determines whether there is new data to read from an OA&M buffer (not shown). If the block 344 determines that there is new data to read, control passes to a block 346, which determines if the new data is valid. If the new data is valid, control passes from the block 346 to a block 348, which read the data from the OA&M buffer. Alternatively, if the block 346 determines that the new data is not valid, control passes from the block 346 to a block 350, which resets the OA&M buffer. After the execution of either the block 348 or the block 350, control passes to a block 352, which is described in further detail hereinafter.

Returning to the block 344, if the block 344 determines that there is no new data to be read, control passes to a block 360, which calculates power levels of each of the channels scanned by the ANF module 100. The OA&M processor 108 is able to calculate power levels at the block 360 because the data generated as the microcontroller 106 of the ANF module 100 scans the various channels is stored in a buffer that may be read by the OA&M processor 108.

After the power levels have been calculated at the block 360, control passes to a block 362, which determines if the any of the calculated power levels exceed a predetermined threshold. If the calculated power levels do exceed the predetermined threshold, control passes from the block 362 to a block 364, which tracks the duration and time of the interferer before passing control to a block 366. Alternatively, if the block 362 determines that none of the power levels calculated to the block 360 exceed the predetermined threshold, control passes from the block 362 directly to the block 366.

The block 366 determines whether the interferer being evaluated was previously denoted as an interferer. If the block 366 determines that the interferer being evaluated was not previously an interferer, control passes to the block 352. Alternatively, the block 366 passes control to a block 368.

At the block 368, the OA&M processor 108 determines whether the present interferer was a previous interferer that has disappeared, if so, the OA&M processor 108 passes control to a block 370. Alternatively, if the present interferer has not disappeared, control passes from the block 368 to a block 372.

At the block 370, the OA&M processor 108 stores the interferer start time and duration. Such information may be stored within the OA&M processor 108 itself or may be stored within the external memory 120 of the OA&M processor 108. After the block 370 has completed execution, control passes to the block 352. At the block 372, the duration of the interferer is incremented to represent the time that the interferer has been present. After the execution of block 372, control passes to the block 352.

The block 352 determines whether a command has been received at the OA&M processor 108 from the reporting and control facility. If such a command has been received, control passes from the block 352 to a block 380. At the block 380, the OA&M processor 108 determines if the command is for the microcontroller 106 of the ANF module 100, or if the command is for the OA&M processor 108. If the command is for the microcontroller 106, control passes from the block 380 to a block 382, which sends the command to the microcontroller 106. After the execution of the block 382, the main routine 340 ends.

Alternatively, if the command received by the OA&M processor 108 is not a command for the microcontroller 106, control passes from the block 380 to a block 384, which prepares a response to the command. Responses may include simple acknowledgments or may include responses including substantive data that was requested. Further detail on the block 384 is provided in conjunction with FIG. 17. After the block 384 has prepared a response, a block 386 activates the serial interrupt of the OA&M processor 108 and ends execution of the main routine 340.

Alternatively, if the block 352 determines that a command was not received, control passes from the block 352 to a block 390, which determines if the bypass switch 116 of FIG. 7 is closed (i.e., the bypass is on). If the block 390 determines that the bypass is not on, the execution of the main routine 340 ends. Alternatively, if the block 390 determines that the bypass is on, control passes from the block 390 to a block 392.

At the block 392, the OA&M processor 108 determines whether there was a prior user command to bypass the ANF module 100 using the bypass switch 116. If such a user command was made, execution of the main routine 340 ends. Alternatively, if there was no prior user command bypass the ANF module 100, control passes from the block 392 to a block 394, which compares the bypass time to a hold time. If the bypass time exceeds the hold time, which may be, for example, one minute, control passes from the block 394 to a block 396.

At the block 396, an alarm is generated by the OA&M processor 108 and such an alarm is communicated to a reporting and control facility by, for example, pulling a communication line connected to the reporting and control facility to a 24 volt high state. After the execution of the block 396, the main routine 340 ends.

Alternatively, if the block 394 determines that the bypass time has not exceeded the hold time, control passes from the block 394 to a block 398, which counts down the hold time, thereby bringing the bypass time closer to the hold time. Eventually, after the block 398 sufficiently decrements the hold time, the block 394 will determine that the bypass time does exceed the hold time and pass control to the block 396. After the block 398 has completed execution, the main routine 340 ends.

Figure 17:
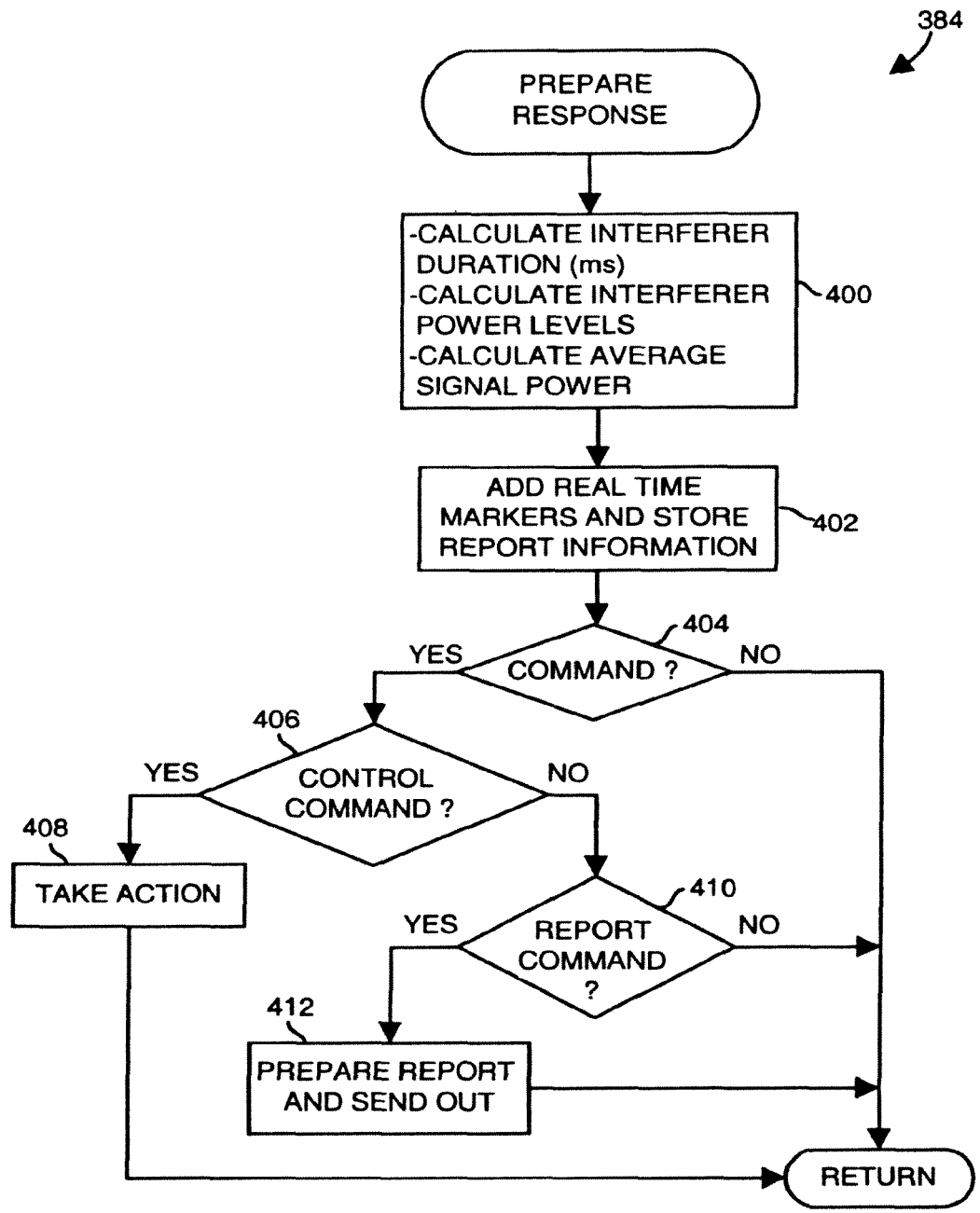
FIG. 17 is an exemplary flow diagram of a prepare response routine executed by the OA&M processor of FIG. 7.

As shown in FIG. 17, the prepare response routine 384 begins execution at a block 400. At the block 400, the OA&M processor 108 reads information that the microcontroller 106 has written into a buffer (e.g., the memory 118 or 120) and calculates the duration of the interferers that are present, calculates interferer power levels and calculates the average signal power. This information may be stored locally within the ANF module 100 or may be reported back to a network administrator in real time. Such reporting may be performed wirelessly, over dedicated lines or via an Internet connection. The interferer power levels and the average signal power may be used to evaluate the spectral integrity of a geographic area to detect the presence of any fixed interferers that may affect base station performance. Additionally, such information may be used to correlate base station performance with the interference experienced by the base station. After the block 400 completes execution, control passes through a block 402.

At the block 402, the OA&M processor 108 adds real time markers to the information calculated in the block 400 and stores the report information including the real time markers and the information calculated in the block 400. Such information may be stored within the OA&M processor 108 itself or may be stored within the external memory 120 of the OA&M processor 108.

After the block 402 has completed execution, control passes to a block 404, which determines whether a command has been received by the ANF module 100. Such commands would be received from a reporting and control facility. If the block 404 determines that no command has been received by the OA&M processor 108, control passes from the block 404 back to the main routine 340, which continues execution at the block 386.

Alternatively, if the block 404 determines that a command has been received by the OA&M processor 108, control passes from the block 404 to a block 406, which determines if the received command is a control command that would be used to control the operation of the ANF module 100 from a remote location, such as the reporting and control facility. If the block 406 determines that the command received is a control command, the block 406 transfers control to a block 408 which takes the action prescribed by the command. Commands may include commands that, for example, commands that enable or disable remote control of the ANF module 100, or may include any other suitable commands. After the execution of the block 408, control passes from the prepare response routine 384 back to the main routine 340, which then ends execution.

Alternatively, if the block 406 determines that the command received by the OA&M processor 108 is not a control command, control passes from the block 406 to a block 410, which determines if the received command is a report command. If the command was not a report command, the block 410 passes control back to the main routine 340. Alternatively, if the block 410 determines that the received command is a report command, control passes from the block 410 to a block 412, which prepares and sends out the interference report. The interference report may include information that shows the parameters of the most recent 200 interferers that were detected by the ANF module 100 and the information on which the microcontroller 106 wrote to a memory 118, 120 that the OA&M processor 108 accesses to prepare the interference report. The interference report may include the frequency number (channel) on which interference was detected, the RF level of the interferer, the time the interferer appeared, the duration of the interferer and the wideband signal power that was present when the interferer was present.

In addition to the interference report, the OA&M processor 108 may prepare a number of different reports in addition to the interference report. Such additional reports may include: mode reports (report the operational mode of the ANF module 100), status reports (reports alarm and system faults of the ANF module 100), software and firmware version reports, header reports (reports base station name, wideband carrier center frequency, antenna number and base station sector), date reports, time reports, activity reports (reports frequency number, RF level, interferer start time, interferer duration, and wideband channel power) and summary reports.

The interference report may be used for network system diagnostic purposes including determining when the network administrator should use a narrowband receiver 28 to determine a telephone number that the mobile unit is attempting to contact and, optionally handling the call. For example, the reporting and control facility may use the narrowband receiver 28 to determine that the user of the mobile unit was dialing 911, or any other emergency number, and may, therefore, decide that the narrowband receiver 28 should be used to handle the emergency call by routing the output of the narrowband receiver 28 to a telephone network.

Additionally, the interference report may be used to determine when a network administrator should control the narrowband receiver 28 to obtain particular information relating to an interferer and retasking the interferer by communicating with its base station. For example, the reporting and control facility may use the narrowband receiver 28 to determine the identity of an interferer, such as a mobile unit, by intercepting the electronic serial number (ESN) of the mobile unit, which is sent when the mobile unit transmits information on the narrowband channel. Knowing the identity of the interferer, the reporting and control facility may contact infrastructure that is communicating with the mobile unit and may request the infrastructure to change the transmit frequency of the mobile unit (i.e., the frequency of the narrowband channel on which the mobile unit is transmitting) or may request the infrastructure to drop communications with the interfering mobile unit all together.

Further, the interference reports may be used by a network administrator to correlate system performance with the information provided in the interference report. Such correlations could be used to determine the effectiveness of the ANF module 100 on increasing system capacity.

After the block 412 has completed execution, control passes back to the main routine 340, which continues execution at the block 386.

Figure 18:
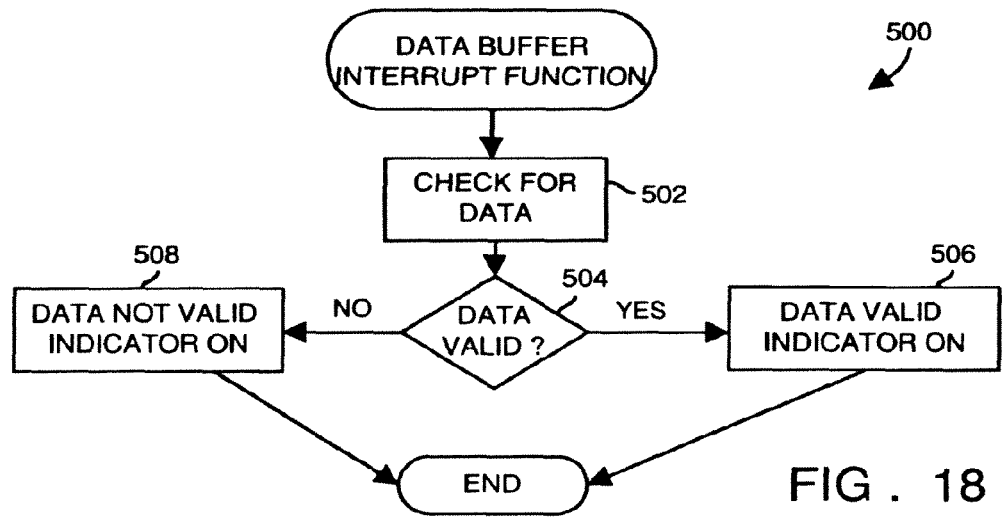
FIG. 18 is an exemplary flow diagram of a data buffer interrupt function executed by the OA&M processor of FIG. 7.

Referring now to FIG. 18, a data buffer interrupt function 500 is executed by the OA&M processor 108 and is used to check for, and indicate the presence of, valid data. The function 500 begins execution at a block 502, which checks for data.

After the execution of the block 502, control passes to a block 504, which checks to see if the data is valid. If the block 504 determines that the data is valid, control passes from the block 504 to a block 506, which sets a valid data indicator before the function 500 ends. Alternatively, if the block 504 determines that the data is not valid, control passes from the block 504 to a block 508, which sets a not valid data indicator before the function 500 ends.

Numerous modifications and alternative embodiments of the invention will be apparent to those skilled in the art in view of the foregoing description. For example, while the foregoing description specifically addressed the concept of eliminating interference from signals on 30 KHz narrowband channels interfering with a 1.25 MHz wideband signal, it will be readily appreciated that such concepts could be applied to wideband channels having, for example, 5, 10 or 15 MHz bandwidths or to contiguous channels that have an aggregate bandwidth of, for example, 5, 10 or 15 MHz. To accommodate such wider bandwidths, banks of downconverters may be operated in parallel to cover 1.25 MHz block of the channel. Accordingly, this description is to be construed as illustrative only and not as limiting to the scope of the invention. The details of the structure may be varied substantially without departing from the spirit of the invention, and the exclusive use of all modifications, which are within the scope of the appended claims, is reserved.

What is claimed is:

1. A non-transitory computer-readable storage device comprising executable instructions which, responsive to being executed by a processor, cause the processor to perform operations comprising:
   detecting signal power levels for narrow frequency bands;
   determining an average wideband power level from the signal power levels;
   selecting a subset of signal power levels of the signal power levels, wherein the selecting of the subset of signal power levels is based on a number of notch modules being utilized by a filter for filtering the narrow band interferers; and
   determining an adaptive threshold from the signal power levels for detecting narrow band interferers in a wide frequency band, wherein the adaptive threshold is determined without utilizing the subset of signal power levels of the signal power levels.

2. The non-transitory computer-readable storage device of claim 1, wherein the number of notch modules being utilized by the filter is a subset of a group of notch modules available to the filter for the filtering of the narrow band interferers.

3. The non-transitory computer-readable storage device of claim 1, wherein the subset of signal power levels includes a group of highest power levels.

4. The non-transitory computer-readable storage device of claim 1, wherein the operations further comprise:
   selecting the number of notch modules to be utilized by the filter from among a group of notch modules according to a signal degradation contributed to by the number of notch modules.

5. The non-transitory computer-readable storage device of claim 1, wherein the operations comprise detecting the narrow band interferers according to the adaptive threshold and the average wideband power level.

6. The non-transitory computer-readable of claim 1, wherein the detecting of the signal power levels is performed in a sequential order of the narrow frequency bands.

7. The non-transitory computer-readable of claim 1, wherein the adaptive threshold has a power level that exceeds the average wideband power level.

8. The non-transitory computer-readable of claim 1, wherein the operations comprise deassigning notch modules of the number of notch modules from the narrow band interferers based on a hysteresis function.

9. The non-transitory computer-readable of claim 1, wherein the narrow frequency bands are selected based on an interference probability determined from historical information associated with the narrow frequency bands.

10. The non-transitory computer-readable of claim 1, wherein the operations further comprise detecting a plurality of narrow band interferers having power levels that exceed the adaptive threshold, wherein the detecting of the signal power levels includes applying frequency shifting to a portion of the wide frequency band to generate RSSI measurements.

11. The non-transitory computer-readable of claim 1, wherein the detecting of the signal power levels, the determining of the average wideband power level, and the determining of the adaptive threshold are performed by a base station.

12. The non-transitory computer-readable of claim 11, wherein the base station is a cellular base station.

13. The non-transitory computer-readable of claim 1, wherein an order of channel scanning for the detecting of the signal power levels is selected based on an interference probability determined from historical information associated with the narrow frequency bands.

14. A device, comprising:
a radio frequency receiver;
a circuit coupled to the radio frequency receiver, wherein execution of instructions by the circuit causes the circuit to perform operations comprising:
measuring signal power levels in narrow frequency bands;
determining a threshold from the measuring of the signal power levels, wherein the threshold is calculated without utilizing a subset of signal power levels of the signal power levels, wherein the subset of signal power levels are selected based on a number of notch modules being employed by a filter for filtering narrow band interference; and
detecting the narrow band interference according to the threshold.

15. The device of claim 14, wherein the number of notch modules is a subset of a group of notch modules available to the filter.

16. The device of claim 15, wherein the operations further comprise:
determining a wideband power level from the measuring of the signal power levels; and
selecting the number of notch modules to be employed from among the group of notch modules according to a signal degradation contributed to by the number of notch modules.

17. The device of claim 14, wherein each of the notch modules includes first and second mixers and a notch filter block, wherein each of the first and second mixers receive inputs from a phase locked loop, and wherein the subset of signal power levels is a group of highest power levels of the narrow frequency bands.

18. The device of claim 14, wherein the device is a cellular base station, wherein the narrow frequency bands are selected based on an interference probability determined from historical information associated with the narrow frequency bands, wherein the subset of signal power levels corresponds to a number of channels that equals the number of notch modules being employed by the filter for filtering the narrow band interference, and wherein the operations further comprise:
scanning, via the radio frequency receiver, a wide frequency band; and
deassigning the notch modules from narrow band interferers according to hang time for a hysteresis function.

19. A method comprising:
determining, by a system including a processor, signal strengths in narrowband channels of a wideband communication signal;
selecting, by the system, a number of notch modules to be employed by a filter for filtering narrow band interference;
selecting, by the system, a subset of signal power levels based on the number of notch modules;
determining, by the system, a threshold based on the signal strengths, wherein the threshold is calculated without utilizing the subset of signal power levels of the narrowband channels; and
detecting, by the system, the narrow band interference in the wideband communication signal according to the threshold.

20. The method of claim 19, wherein the number of notch modules is a subset of a group of notch modules available to the filter, wherein the selecting of the number of notch modules from among the group of notch modules is according to a signal degradation contributed to by the number of notch modules, and further comprising:
deassigning the notch modules from narrow band interferers according to hang time for a hysteresis function, wherein the subset of signal power levels includes a group of highest power levels of the narrowband channels.

* * * * *